US009571268B2

(12) United States Patent
Kipnis et al.

(10) Patent No.: US 9,571,268 B2
(45) Date of Patent: *Feb. 14, 2017

(54) METHOD AND SYSTEM FOR HOMOMORPHICLY RANDOMIZING AN INPUT

(71) Applicant: Cisco Technology, Inc., San Jose, CA (US)

(72) Inventors: Aviad Kipnis, Efrat (IL); Eliphaz Hibshoosh, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/132,271

(22) Filed: Apr. 19, 2016

(65) Prior Publication Data
US 2016/0234010 A1  Aug. 11, 2016

Related U.S. Application Data

(63) Continuation of application No. 14/417,184, filed as application No. PCT/IB2013/056102 on Jul. 25, 2013, now Pat. No. 9,350,543.

(30) Foreign Application Priority Data

Jul. 26, 2012  (IL) .......................................... 221152
Jan. 24, 2013  (IL) .......................................... 224400

(51) Int. Cl.
*H04L 9/00* (2006.01)
*H04L 9/08* (2006.01)
(Continued)

(52) U.S. Cl.
CPC .............. *H04L 9/008* (2013.01); *G06F 7/582* (2013.01); *H04L 9/002* (2013.01); *H04L 9/065* (2013.01);
(Continued)

(58) Field of Classification Search
USPC .......................................................... 380/46
See application file for complete search history.

(56) References Cited

U.S. PATENT DOCUMENTS 7,254,586 B2   8/2007  Chen et al.
7,472,093 B2  12/2008  Juels
(Continued)

FOREIGN PATENT DOCUMENTS

WO      98/08323      2/1998
WO   2010/100015      9/2010

OTHER PUBLICATIONS

Brakerski, Zvika; "Efficient Fully Homomorphic Encryption" From (Standard) LWE, FOCS. 2011; Proceedings of the 2011 IEEE 52nd Annual Symposium on Foundations of Computer Science, Dec. 1, 2011; pp. 97-106.
(Continued)

*Primary Examiner* — Jeffrey Pwu
*Assistant Examiner* — Samuel Ambaye
(74) *Attorney, Agent, or Firm* — Samuel M. Katz

(57) ABSTRACT

In one embodiment, a method for reducing information leakage in order to counter side channel attacks against a secure execution environment is described, the method including receiving at the secure execution environment a first input comprising a key comprising a sequence of k input elements in a commutative ring, CR, receiving at the secure execution environment a second input comprising a text comprising a sequence of p input elements in the commutative ring, CR, defining an input INP comprising a sequence of j input elements, wherein INP comprises either one or both of the first input or the second input, performing one of a matrix randomization operation or a polynomial randomization operation on the inputs, and producing a randomized output.

14 Claims, 7 Drawing Sheets

(51) Int. Cl.
*H04L 9/30* (2006.01)
*H04L 9/06* (2006.01)
*G06F 7/58* (2006.01)

(52) U.S. Cl.
CPC ........... *H04L 9/0631* (2013.01); *H04L 9/0643* (2013.01); *H04L 9/08* (2013.01); *H04L 9/0869* (2013.01); *H04L 9/302* (2013.01); *H04L 9/3093* (2013.01); *G06F 7/58* (2013.01); *H04L 9/00* (2013.01); *H04L 2209/08* (2013.01); *H04L 2209/24* (2013.01)

(56) References Cited

U.S. PATENT DOCUMENTS

| | | | | |
|---|---|---|---|---|
| 2010/0329454 | A1* | 12/2010 | Takashima | H04L 9/3073 380/44 |
| 2011/0110525 | A1* | 5/2011 | Gentry | H04L 9/0822 380/285 |
| 2011/0243320 | A1* | 10/2011 | Halevi | H04L 9/008 380/30 |
| 2011/0264920 | A1* | 10/2011 | Rieffel | H04L 9/008 713/189 |

OTHER PUBLICATIONS

Digital Signature Standard (DSS), Jun. 1, 2009—FIPS 186-3
Gentry, Craig; "Fully Homomorphic Encryption Using Ideal Lattices"; Jun. 2, 2009.
Gentry, Craig; "Implementing Gentry's Fully-Homomorphic Encryption Scheme"; Feb. 4, 2011.
Lauter, Kristin; "Can Homomorphic Encryption be Practical": Proceedings of the ACM workshop on Clud computing security workshop, pp. 113-124 NY, USA; Oct. 17, 2011.
Ong, H.; "An Efficient Signature Scheme Based on Quadric Equations"; Proceedings of the 16th Annual Symposium on the Theory of Computing; Dec. 1, 1984; pp. 208-216.
Pollard, John M.;"An Efficient Solution of the Congruence X2 + k.y2 = m(modn)"; IEEE Transactions on Information, v. IT-33, n 5, Sep. 1, 1987; pp. 702-709.
Rivest, R.L; "A Method For Obtaining Digital Signatures and Public-Key Cryptosystems"; (Communications of the ACM, vol. 21, Issue2. pp. 120-126: Feb. 1, 1976).
Rivest, Ronald L.; "On Data Banks and Privacy Homomorphisms"; Foundations of Secure Computation, Jan. 1, 1978.
Xiao, Liangliang; "An Efficient Homomorphic Encryption Protocol for Multi-User Systems"; Feb. 1, 2012.
International Search Report issued for WO2014/016795 and dated Feb. 10, 2014.

* cited by examiner

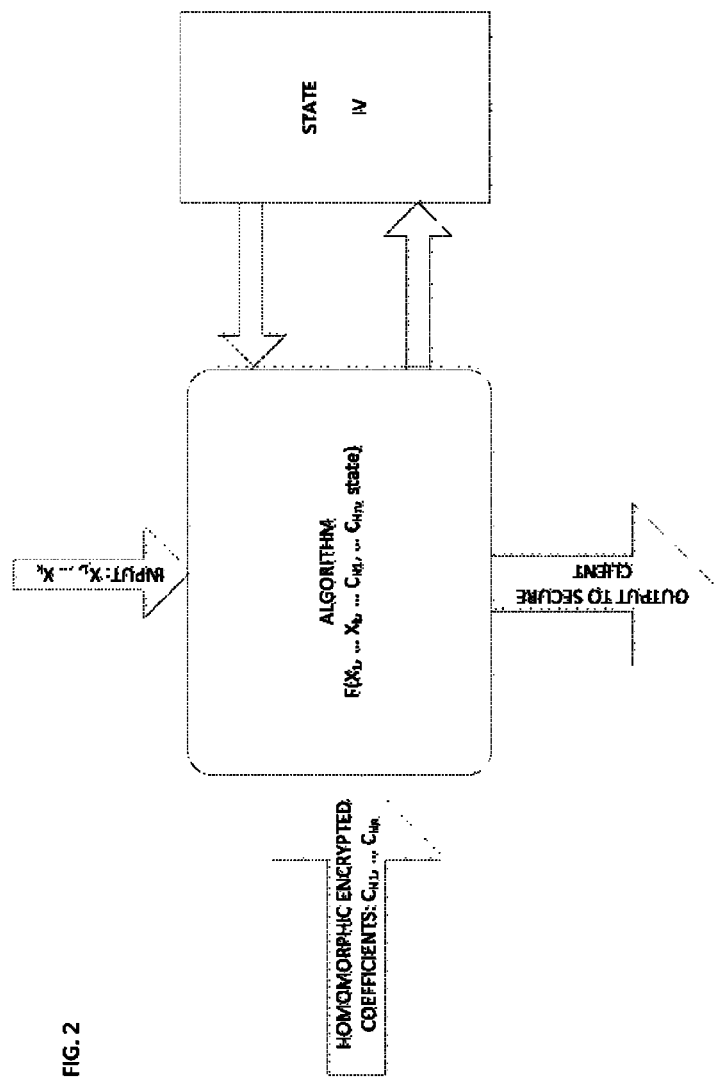

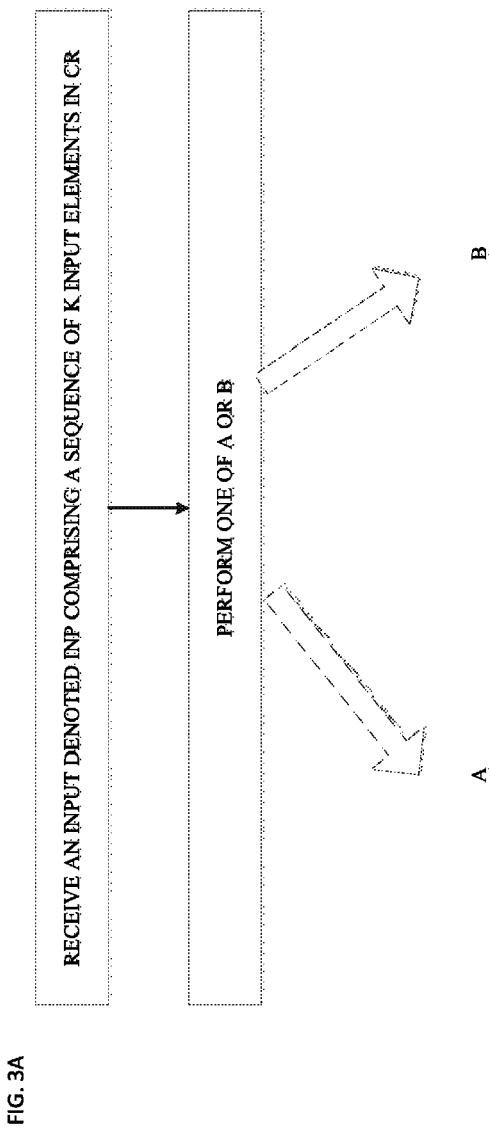

FIG. 3C

DETERMINE RANDOM OUTPUT $A_{im}$ FOR THE m INPUT ELEMENTS IN SET i DENOTED AS $\{X_{im}\} = X_1, X_2, ..., X_{im}$ BY UTILIZING A MATRIX-BASED RANDOMIZING AND HOMOMORPHIC TRANSFORMATION FUNCTION HEREINAFTER DENOTED MRHT, WHEREIN MRHT($\{X_{im}\}$) = $A_{im}$ =

$$\begin{pmatrix} X_1 & 0 & 0 & 0 & \cdots & 0 \\ 0 & X_2 & 0 & \cdots & \cdots & 0 \\ 0 & 0 & \ddots & \cdots & \cdots & \cdots \\ \cdots & \cdots & \cdots & X_m & \cdots & \cdots \\ \cdots & \cdots & \cdots & 0 & Y_1 & \cdots \\ \cdots & \cdots & \cdots & 0 & Y_2 & \ddots \\ 0 & 0 & \cdots & \cdots & \cdots & Y_{n-m} \end{pmatrix} S^{-1} = \begin{pmatrix} a_{11} & \cdots & a_{1n} \\ \vdots & \ddots & \vdots \\ a_{n1} & \cdots & a_{nn} \end{pmatrix}$$

THEREBY PRODUCING A RANDOM OUTPUT $A_{im}$ CORRESPONDING TO THE i SET OF m INPUT ELEMENTS = $X_1, X_2, ..., X_m$

ововInput

METHOD AND SYSTEM FOR HOMOMORPHICLY RANDOMIZING AN INPUT

RELATED APPLICATIONS

The present application is a continuation application of U.S. application Ser. No. 14/417,184, which entered US national phase as a 35 USC §371 application of PCT/IB2013/056102, filed on 25 Jul. 2013 and entitled "Method and System for Homomorphicly Randomizing an Input", which was published in the English language with International Publication Number WO 2014/016795, and which claims the benefit of priority from IL Patent Application IL 221152 of NDS Limited, filed 26 Jul. 2012, and the benefit of priority from IL Patent Application IL 224400 of NDS Limited, filed 24 Jan. 2013. U.S. application Ser. No. 14/417,184 was published with publication number 2015/0215123 on 30 Jul. 2015.

FIELD OF THE INVENTION

The present invention relates to systems and methods of homomorphic randomization and encryption.

BACKGROUND OF THE INVENTION

Can Homomorphic Encryption be Practical, by Kristin Lauter, Michael Naehrig, Vinod Vaikuntanathan, July 2011 describes that the prospect of outsourcing an increasing amount of data storage and management to cloud services raises many new privacy concerns for individuals and businesses alike. The privacy concerns can be satisfactorily addressed if users encrypt the data they send to the cloud. If the encryption scheme is homomorphic, the cloud can still perform meaningful computations on the data, even though it is encrypted.

The promise of practical homomorphic encryption is sought by government, industry, and society. IBM and Microsoft have been vigorously pursuing research towards its potential promise as it, for example, enables 'secure encrypted search' (or 'privacy-preserving information transfer') by a public (open) cloud server; the server, for example, searches in an encrypted medical database (without knowing the query or the result), and delivering the encrypted result for decryption by the secure client. Yet another application of 'secure function evaluation' is where the open untrusted server executes a secret algorithm for an input without knowing the nature of the algorithm or the result. Thus a hacker who is presumed to have gained an open access to the public cloud server (even a malicious cloud service employee) presents no threat of compromise of the information or transaction. The applications of this homomorphic encryption are many and will enable wide-spread use of cloud computing allowing, for example, security conscious government and financial industry to move their services to the public cloud by encrypting their data bases and make them available for cloud computing without ever worrying about a security violation by the cloud service or outside hackers. Further, this privacy-preserving technology helps society cope with ever increasing attacks on confidential data not to mention private clouds. Note that the security of the above is not a result of a moving-target paradigm (e.g., software that is rapidly updated to thwart hackers' analysis) or clear software obfuscation but inherent in the mathematical nature of the homomorphic cryptosystem.

To date, homomorphic systems have been found to be impractical; only restricted special-case constrained uses have been shown to be of some potential for practical use.

Gentry et al. in STOC '09, Proceedings of the 41$^{st}$ Annual ACM Symposium on Theory of Computing, pgs. 169-178, proposes a fully homomorphic encryption scheme—i.e., a scheme that allows one to evaluate circuits over encrypted data without being able to decrypt.

Xiao et al, in a paper entitled, An Efficient Homomorphic Encryption Protocol for Multi-User Systems, available at www.utdallas.edu/~ilyen/techrep/HPbound.pdf propose a solution for the homomorphic encryption problem.

The following patent references are also believed to reflect the state of the art:
U.S. Pat. No. 7,254,586 to Chen et al;
WO/2010/100015 of INTRINSIC ID B.V.;
US 20100329454 of Takashima;
U.S. Pat. No. 7,472,093 to Juels; and
US 20110110525 of Gentry.

SUMMARY OF THE INVENTION

The present invention, in certain embodiments thereof, seeks to provide an improved practical fully homomorphic encryption system for specific data in $Z_N$ ($Z_N$ is the ring of residues modulo N; N is factored by two primes, p and q)) slated for crypto applications. For certain applications it is desirable to use random, large numbers in $Z_N$, where large numbers are, for example, 1 Kbit, for practical considerations, based on the current state of the art.

Homomorphic encryption is a form of encryption which allows specific types of computations to be carried out on cipher text and obtain an encrypted result which is the cipher text of the result of operations performed on the plaintext. For instance, one person could add two encrypted numbers and then another person could decrypt the result, without either of them being able to find the value of the individual numbers. Homomorphic encryption schemes are malleable by design. The homomorphic property of various cryptosystems can be used to create secure voting systems, collision-resistant hash functions, private information retrieval schemes and enable widespread use of cloud computing by ensuring the confidentiality of processed data.

High performance non-deterministic fully-homomorphic methods for practical—randomization of data (over commutative ring) are presented herein, and symmetric-encryption of mod-N data over ring $Z_N$ well suited for crypto applications. Embodiments of the present invention secure, for example, the multivariate input or the coefficients of a public polynomial function for running in an open untrusted environment. The methods employed may also provide enhanced protection for some existing crypto algorithms against certain attacks, e.g., securing OSS public key signature against Pollard attack. Further, the efficient nature of the methods (one large-numbers multiplication per encryption and six for the product of two encrypted values) motivates and enables the use of low cost collaborative security platforms for applications such as keyed-hash or private key derivation algorithms. Such platform is comprised of a low-cost (low performance) security element supported by an untrusted high performance server running the homomorphic algorithms. It is shown that random plaintext data is the sufficient condition for proof of security for the homomorphic encryption. The homomorphic randomization of data over a commutative ring offers protection against side-channel attacks (DPA) on, for example, AES key. Further, the methods have inherent coupling of parallel and inseparable computations that provide both fault detection and verification of computed-data integrity.

The proposed encryption scheme is expected to provide security solutions for many applications and for client/server models that include:
1. A low-cost-security platform; and
2. An Open untrusted platform as the public cloud server indicated above.

The low-cost-security platform is comprised of two elements that provide the collaborative security:
a) a Low-security High-performance component (e.g., PC (personal computer), STB (set top box) or mobile computing device), that performs homomorphic calculations, while hiding its secrets, and
b) a High-security Low-performance element (e.g., low-cost SC (smart card), RFID (radio frequency identification), SIM (subscriber identification module), or secure OTP (one-time programmable memory) serving a Secure Execution Environment) that securely holds long term secrets and use them to perform few elementary calculations in a trusted environment.

This platform is labeled as (LHHL) or $(LH)^2$ platform. Such platform could define a secure client made up of STB and SC, a smartphone with SIM, or Connected TV with an Arm TrustZone (or other secure execution environment).

The Open platform is, for example, and without limiting the generality of the foregoing, a PC (or a process running on a PC) residing in a public network (cloud) that is presumed to be untrusted.

By way of example, applications may use Homomorphic Encryption of data for:
Efficient PK-based (public/private key) signature, using Homomorphically-Modified OSS (HoMoSS). Under this new scheme OSS is made immune to Pollard attack (as described below) and essentially retains its efficiency in comparison with RSA signing operation. In such application the signer that holds the private key is a $(LH)^2$ platform. Verification of the PK signature can be made within an Open platform.
Hiding symmetric keys. Verification of a Keyed Hashed (e.g., secure HMAC verification) by a $(LH)^2$ client—for instance, and without limiting the generality of the foregoing, an STB with SC—where the STB performs homomorphic computation of most of the verification operation, while the SC performs the final step requiring decryption using the secret symmetric key.

There is thus provided in accordance with an embodiment of the present invention a fully homomorphic method for randomizing an input, wherein all computations are over a commutative ring hereinafter denoted as CR, the method including receiving an input denoted INP including a sequence of k input elements in CR, performing either (a) or (a): (a) randomly choosing a secret n×n matrix in CR, hereinafter denoted as S, S being utilized as a symmetric randomizing key, wherein S includes an invertible matrix over CR, determining $S^{-1}$, for each set i of m distinct input elements among k elements including INP, wherein 0<m<k+1 and m<n selected from INP that are to be jointly randomized, and denoted hereinafter as $X_1, X_2, \ldots, X_m$, selecting n−m (n minus m) random numbers $Y_1, Y_2, \ldots Y_{n-m}$, in CR, where the input elements $X_1, X_2, \ldots, X_m$, at least one random number selected from among the set of random numbers $Y_1, Y_2, \ldots Y_{n-m}$, and, optionally, one or more constants are placed in a diagonal of an n×n diagonal matrix, denoted M, wherein, aside from the diagonal, matrix M is only populated by zeros, and determining random output $A_{im}$ for the m input elements in set i denoted as $\{X_{im}\}=X_1, X_2, \ldots, X_m$, by utilizing a matrix-based randomizing and homomorphic transformation function hereinafter denoted MRHT, wherein $$MRHT(\{X_{im}\}) = A_{im} = SMS^{-1} = \begin{pmatrix} a_{11} & \cdots & a_{1n} \\ \vdots & \ddots & \vdots \\ a_{n1} & \cdots & a_{nn} \end{pmatrix}$$

thereby producing a random output $A_{im}$ corresponding to the i set of m input elements $\{X_{im}\}=X_1, X_2, \ldots, X_m$, and (b) selecting n random numbers in CR, the n random numbers hereinafter denoted as $v_1, v_2, \ldots, v_n$, determining a public polynomial $P(v)=\Pi_{i=1}^{n}(v-v_i)=\Sigma_{j=0}^{n}C_j \cdot v^j (C_n=1)$, selecting a polynomial-based randomizing and homomorphic transformation function hereinafter denoted PRHT $(X_{im})$, including any function in variable v of the form $\Sigma_{j=0}^{n-1} a_{ij} \cdot v^j$ which satisfies the equations $$\Sigma_{j=0}^{n-1} a_{ij} \cdot v_1^j = x_1, \Sigma_{j=0}^{n-1} a_{ij} \cdot v_2^j = x_2, \ldots, \Sigma_{j=0}^{n-1} a_{ij} \cdot v_m^j = x_m,$$

choosing n−m random values in CR, for $a_{i,m}, a_{i,m+1} \ldots, a_{i,n-1}$, that would yield a solution for the above equations for $a_{i,0}, a_{i,1} \ldots, a_{i,m-1}$ and performing either (c) or (d): (c) producing a random output $A_{im}$ corresponding to input elements $X_1, X_2, \ldots, X_m$ including the set $(a_{i0}, a_{i1}, \ldots, a_{i\,n-1})$ and public set of coefficients $(C_0, C_1, \ldots, C_{n-1}, C_n)$ of $P(v)$, wherein the public set of coefficients $(C_0, C_1, \ldots, C_{n-1}, C_n)$ are required for arithmetic performing operations with input elements, and (d) selecting for the given input elements $X_1, X_2, \ldots, X_m$, n−m random values $R_1, \ldots, R_{n-m}$ in CR that would solve the following n simultaneous equations $\Sigma_{j=0}^{n-1} a_{ij} \cdot v_1^j = x_1, \Sigma_{j=0}^{n-1} a_{ij} \cdot v_2^j = x_2, \ldots, \Sigma_{j=0}^{n-1} a_{ij} \cdot v_{m+1}^j = R_1, \Sigma_{j=0}^{n-1} a_{ij} \cdot v_{m+2}^j = R_2, \ldots, \Sigma_{j=0}^{n-1} a_{ij} \cdot v_n^j = R_{n-m}$ for unknowns $a_{i0}, a_{i1}, \ldots, a_{i\,n-1}$, thereby producing, for $X_1, X_2, \ldots X_m$ a random text including the set $(a_{i0}, a_{i1}, \ldots, a_{i\,n-1})$ and public set $(C_0, C_1, \ldots, C_{n-1}, C_n)$ of $P(v)$.

Further in accordance with an embodiment of the present invention the randomization of the input INP includes a successive application of a mix of functions PRHT($X_i$) and MRHT($X_i$), where $X_i$ denotes a set of m distinct input elements of INP and wherein $$MRHT(PRHT(X_i)) = (MRHT(a_{i0}), MRHT(a_{i1}), \ldots, MRHT(a_{i\,n-1})) = \left( \begin{pmatrix} a_{11} & \cdots & a_{1n} \\ \vdots & \ddots & \vdots \\ a_{n1} & \cdots & a_{nn} \end{pmatrix}_{i0}, \begin{pmatrix} a_{11} & \cdots & a_{1n} \\ \vdots & \ddots & \vdots \\ a_{n1} & \cdots & a_{nn} \end{pmatrix}_{i1}, \ldots, \begin{pmatrix} a_{11} & \cdots & a_{1n} \\ \vdots & \ddots & \vdots \\ a_{n1} & \cdots & a_{nn} \end{pmatrix}_{i\,n-1} \right), \text{ and}$$

$$PRHT(MRHT(X_i)) = PRHT\left( \begin{pmatrix} a_{11} & \cdots & a_{1n} \\ \vdots & \ddots & \vdots \\ a_{n1} & \cdots & a_{nn} \end{pmatrix} \right) \text{ where}$$

$PRHT(a_{mj}) = (a_0, a_1, \ldots, a_{n-1})_{mj}$, therefore $$PRHT(MRHT(X_i)) = \begin{pmatrix} (a_0, a_1, \ldots, a_{n-1})_{11} & \cdots & (a_0, a_1, \ldots, a_{n-1})_{1n} \\ \vdots & \ddots & \vdots \\ (a_0, a_1, \ldots, a_{n-1})_{n1} & \cdots & (a_0, a_1, \ldots, a_{n-1})_{nn} \end{pmatrix}.$$

Still further in accordance with an embodiment of the present invention performing either one of (a) and (b): (a) receiving an output including a randomized $X_{im}$ input being an n×n diagonal matrix denoted hereinafter as $A_{im}$, over CR, where $$A_{im} = MRHT(X_{im}) = S_{MS}^{-1} = \begin{pmatrix} a_{11} & \cdots & a_{1n} \\ \vdots & \ddots & \vdots \\ a_{n1} & \cdots & a_{nn} \end{pmatrix}$$

using S to determine $$S^{-1} = \begin{pmatrix} s'_{11} & \cdots & s'_{1n} \\ \vdots & \ddots & \vdots \\ s'_{n1} & \cdots & s'_{nn} \end{pmatrix}$$

and determining $X_{im}$ by performing one of $S^{-1} \cdot A_{im} \cdot S = M$ where $X_1, X_2, \ldots, X_m$ are the upper left elements of the resulting diagonal matrix above, alternatively $X_i = (1/s'_{i1}) \cdot \Sigma_{j=1}^{n} a_{j1} \cdot s'_{ij}$ for $i=1, \ldots, m$, and (b) receiving the randomized output for $X_{im}$ as $(a_{i0}, a_{i1}, \ldots, a_{i\,n-1})$ and using $v_1, v_2, \ldots, v_m$ to determine the derandomized input $\Sigma_{j=0}^{n-1} a_{ij} \cdot v_1^j = X_1, \Sigma_{j=0}^{n-1} a_{ij} \cdot v_2^j = X_2, \ldots, \Sigma_{j=0}^{n-1} a_{ij} \cdot v_m^j = X_m$.

Additionally in accordance with an embodiment of the present, the method including for $X_i$ including MRHT $(X_i)=A_i$ receiving $A_1$ and $A_2$, and MRHT $(X_1)$+MRHT $(X_2)=A_1+A_2$, and for $X_i$ including PRHT $(X_i)=a_{i0}, a_{i1}, \ldots, a_{i\,n-1}$ receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, \ldots, C_{n-1}, C_n$ of $P(v)=\Sigma_{j=0}^{n} C_j \cdot v^j$ $(C_n=1)$, and PRHT $(X_1)$+PRHT $(X_2)=a_{10}+a_{20}a_{11}+a_{21}, \ldots, a_{1\,n-1}+a_{2\,n-1}$.

Moreover in accordance with an embodiment of the present invention, the method including for $X_i$ including MRHT $(X_i)=A_i$ receiving $A_1$ and $A_2$, and MRHT $(X_1) \cdot$MRHT $(X_2)=A_1 \cdot A_2$, and for $X_i$ including PRHT $(X_i)=a_{i0}, a_{i1}, \ldots, a_{i\,n-1}$ receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, \ldots, C_{n-1}, C_n$ of $P(v)=\Sigma_{j=0}^{n} C_j \cdot v^j$ $(C_n=1)$, and PRHT $(X_1) \cdot$PRHT $(X_2)=r_{10}, r_{11}, \ldots, r_{1\,n-1}$, the coefficients of the resulting n-1 order polynomial $r(v)$, where $r(v)= ((\Sigma_{j=0}^{n-1} a_{1j} \cdot v^j) \cdot (\Sigma_{j=0}^{n-1} a_{2j} \cdot v^j)) \bmod \Sigma_{j=0}^{n} C_j \cdot v^j$.

Further in accordance with an embodiment of the present invention for $X_i$ including MRHT $(X_i)=A_i$ receiving $A_1$ and $A_2$, 1/MRHT $(X_2)=A_2^{-1}$ and MRHT $(X_1)$/MRHT $(X_2)=A_1 \cdot A_2^{-1}$ for $X_i$ including PRHT $(X_i)=a_{i0}, a_{i1}, \ldots, a_{i\,n-1}$ receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, \ldots, C_{n-1}, C_n$ of $P(v)=\Sigma_{j=0}^{n} C_j \cdot v^j$ $(C_n=1)$, deriving 1/PRHT $(X_2)=u_{20}, u_{21}, \ldots, u_{2\,n-1}$ by calculating $((\Sigma_{j=0}^{n-1} u_{2j} \cdot v^j) \cdot (\Sigma_{j=0}^{n-1} a_{2j} \cdot v^j)) \bmod \Sigma_{j=0}^{n} C_j \cdot v^j = 1$ in terms of n unknown coefficients $u_{2j}$, $(j=0, \ldots, n-1)$, thereby determining $$\Sigma_{j=0}^{n-1} g_{2j}(u_{20}, u_{21}, \ldots, u_{2\,n-1}, a_{10}, a_{21}, \ldots, a_{2\,n-1}, c_{10}, c_{21}, \ldots, c_{2\,n-1}) \cdot v^j),$$

wherein $g_{2j}(\ )$ is a linear combination of a plurality of n unknowns $u_{2j}$, and solving n derived equations $g_{20}(\ )=1$, and $g_{2j}(\ )=0$ for $j=1, \ldots, n-1$ for all $u_{2j}$ $j=0, \ldots, n-1$, and $$PRHT(X_1)/PRHT(X_2)=PRHT(X_1) \cdot (1/PRHT(X_2))=\\((\Sigma_{j=0}^{n-1} a_{1j} \cdot v^j) \cdot (\Sigma_{j=0}^{n-1} u_{2j} \cdot v^j)) \bmod \Sigma_{j=0}^{n} C_j \cdot v^j.$$

Still further in accordance with an embodiment of the present invention at least one of the randomized inputs comprises a cryptographic key.

Additionally in accordance with an embodiment of the present invention the cryptographic key comprises an AES key.

Moreover in accordance with an embodiment of the present invention the at least one of the randomized inputs comprises a mod N-number polynomial coefficient.

Further in accordance with an embodiment of the present invention the mod N-number polynomial coefficient is used for a Private Function Key Generation.

Still further in accordance with an embodiment of the present invention the mod N-number polynomial coefficient is used for a private hash-based message authentication code.

Moreover in accordance with an embodiment of the present invention the mod N-number polynomial coefficient is used for generating an OSS signature.

Further in accordance with an embodiment of the present invention input includes a plain text, the output includes a cipher text, and all computations are performed modulo N over a ring $Z_N$, where N is a product of two prime numbers, and matrix S includes symmetric encryption key, wherein the encryption functions are denoted as MEnc and PEnc correspond to MRHT and PRHT, respectively.

Additionally in accordance with an embodiment of the present invention the encryption of the plain text includes a successive application of a mix of encryption functions $PEnc=PRHT(X_i)$ and $MEnc=MRHT(X_i)$, wherein $$MEnc(PEnc(X_i)) = (MEnc(a_{i0}), MEnc(a_{i1}), \ldots, MEnc(a_{i\,n-1})) == \\ \left( \begin{pmatrix} a_{11} & \cdots & a_{1n} \\ \vdots & \ddots & \vdots \\ a_{n1} & \cdots & a_{nn} \end{pmatrix}_{i0}, \begin{pmatrix} a_{11} & \cdots & a_{1n} \\ \vdots & \ddots & \vdots \\ a_{n1} & \cdots & a_{nn} \end{pmatrix}_{i1}, \ldots, \begin{pmatrix} a_{11} & \cdots & a_{1n} \\ \vdots & \ddots & \vdots \\ a_{n1} & \cdots & a_{nn} \end{pmatrix}_{i\,n-1} \right), \text{ and}$$

$$PEnc(MEnc(X_i)) = PEnc\left( \begin{pmatrix} a_{11} & \cdots & a_{1n} \\ \vdots & \ddots & \vdots \\ a_{n1} & \cdots & a_{nn} \end{pmatrix} \right) \text{ where}$$

$$PEnc(a_{ij}) = (a_0, a_1, \ldots, a_{n-1})_{ij}.$$

Moreover in accordance with an embodiment of the present invention the received output includes a cipher text denoted C, the cipher text C being produced according to the method described hereinabove, and the derandomized input includes a plain text, and all computations are performed modulo N over a ring $Z_N$, where N is a product of two prime numbers, and matrix S includes symmetric encryption key.

Further in accordance with an embodiment of the present invention for addition of a pair of cipher text outputs Ci and Cj, Ci and Cj comprising cipher texts produced according to the method described herein above, the method comprising adding Ci and Cj as described above wherein all computations are performed modulo N over a ring $Z_N$, where N is a product of two prime numbers, and matrix S comprises symmetric encryption key.

Still further in accordance with an embodiment of the present invention for multiplication of a pair of cipher text outputs Ci and Cj, Ci and Cj comprising cipher texts produced according to the method described herein above, the method including multiplying Ci and Cj as described above, wherein all computations are performed modulo N over a ring $Z_N$, where N is a product of two prime numbers, and matrix S includes a symmetric encryption key.

Additionally in accordance with an embodiment of the present invention for division of a pair of cipher texts outputs Ci and Cj, Ci and Cj comprising cipher texts produced according to the method described herein above, the method including dividing Ci and Cj as described above wherein all computations are performed modulo N over a ring $Z_N$, where N is a product of two prime numbers, and matrix S includes symmetric encryption key.

Moreover in accordance with an embodiment of the present invention for verifying that a returned result of a calculation performed by a third party is valid, the result being performed by the method of any of the above claims, the result being denoted $R^*_M$ for a result returned using an MRHT or MEnc function denoted as M, and the result being denoted $R^*_P$ for a result returned using a PRHT or PEnc function denoted as P, the result including a result of a homomorphic calculation denoted f performed on $A_1$, $A_2, \ldots, A_k$ wherein $A_i$ is equal to one of $M(X_i)$ and $P(X_i)$, $f(A_1, A_2, \ldots, A_k)$ is equal to one of M ($f(X_1, X_2, \ldots, X_k))=f(M(X_1), M(X_2), \ldots, M(X_k))$ and $P(f(X_1, X_2, \ldots, X_k))=f(P(X_1), P(X_2), \ldots, P(X_k))$ the method including receiving the result of $f(A_1, A_2, \ldots, A_k)$ in the one of the forms $$M(f(X_1, X_2, \ldots, X_K)) = S \begin{pmatrix} f(X_1, X_2, \ldots, X_K)\ldots & 0\ldots & 0 \\ \ldots & \ldots & \ldots \\ 0\ldots & f(Y_{m1}, Y_{m2}, \ldots, Y_{mk})\ldots & 0 \\ \ldots & \ldots & \ldots \\ 0\ldots & 0\ldots & f(Y_{n-1,1}, Y_{n-1,2}, \ldots, Y_{n-1,k}) \end{pmatrix} S^{-1} = R^*_M,$$

and $f(A_1, A_2, \ldots, A_k)$ in the form of $a^*_0, a^*_1 \ldots, a^*_{n-1}, =R^*_P$, in the case where the result is in the form of $R^*_M$ computing $f(Y_{m1}, Y_{m2}, \ldots, Y_{mk})$, denoted as Q, for any m, m=1, 2, ..., n–1 where $Y_{mj}$ includes the $m^{th}$ random value used in one of encrypting, and randomizing $X_j$, performing one of decrypting, and derandomizing $R^*_M$ thereby determining $f(Y_{m1}, Y_{m2}, \ldots, Y_{mk})$, denoted as E from the resulting matrix diagonal of m+1 row, and deeming the result the of the computation of f(Xi) valid if E equals to Q, and in the case where the result is in the form of $R^*_P$ computing $f(Y_{m1}, Y_{m2}, \ldots, Y_{mk})$, denoted as Q, for any m, m=1, 2, ..., n–1 where $Y_{mj}$ includes the $m^{th}$ random value used in one of encrypting, and randomizing $X_j$, performing one of decrypting, and derandomizing $R^*_P$, thereby determining $\Sigma_{j=0}^{n-1} a^*_j \cdot v_{m+1}^j = f(R_{m1}, R_{m2}, \ldots, R_{mk})$, denoted as E, and deeming the result the of the computation of $f(X_1, X_2, \ldots, X_K)$ valid if E equals Q.

BRIEF DESCRIPTION OF THE DRAWINGS

The present invention will be understood and appreciated more fully from the following detailed description, taken in conjunction with the drawings in which:

FIG. 2 is a depiction of an embodiment of the system of FIG. 1 where a private algorithm and a public input are used; and FIGS. 3A-3E are data flow diagrams depicting methods for the various embodiments of the system of FIG. 1.

The present invention will be understood and appreciated more fully from the following detailed description, taken in conjunction with the Appendices in which:

Appendix A is a paper published at eprint.iacr.org/2012/637.pdf, entitled Efficient Methods for Practical Fully-Homomorphic Symmetric-key Encryption, Randomization, and Verification, by the inventors of the invention described herein, and which provides a mathematical approach, including proofs, to the method and security described herein. Said paper is also found as Appendix A of published PCT application, WO 2014/016795. The disclosures of said publication and Appendix A of said PCT application are incorporated herein by reference.

DETAILED DESCRIPTION OF AN EMBODIMENT

Figure 1:
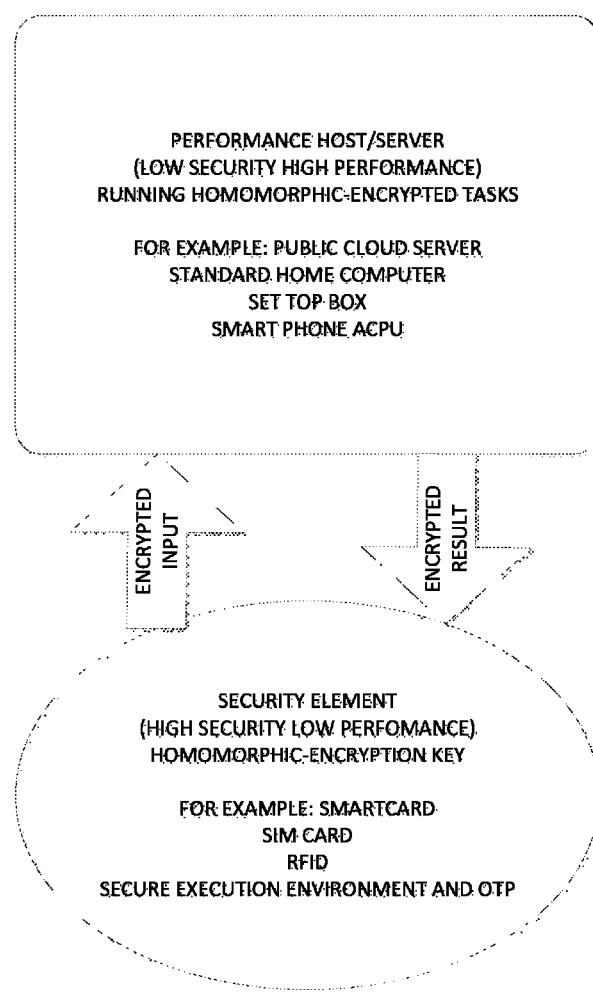
FIG. 1 is a simplified depiction of a low security high performance device interacting with a high security low performance device constructed and operative in accordance with an embodiment of the present invention.
Figure 3B:
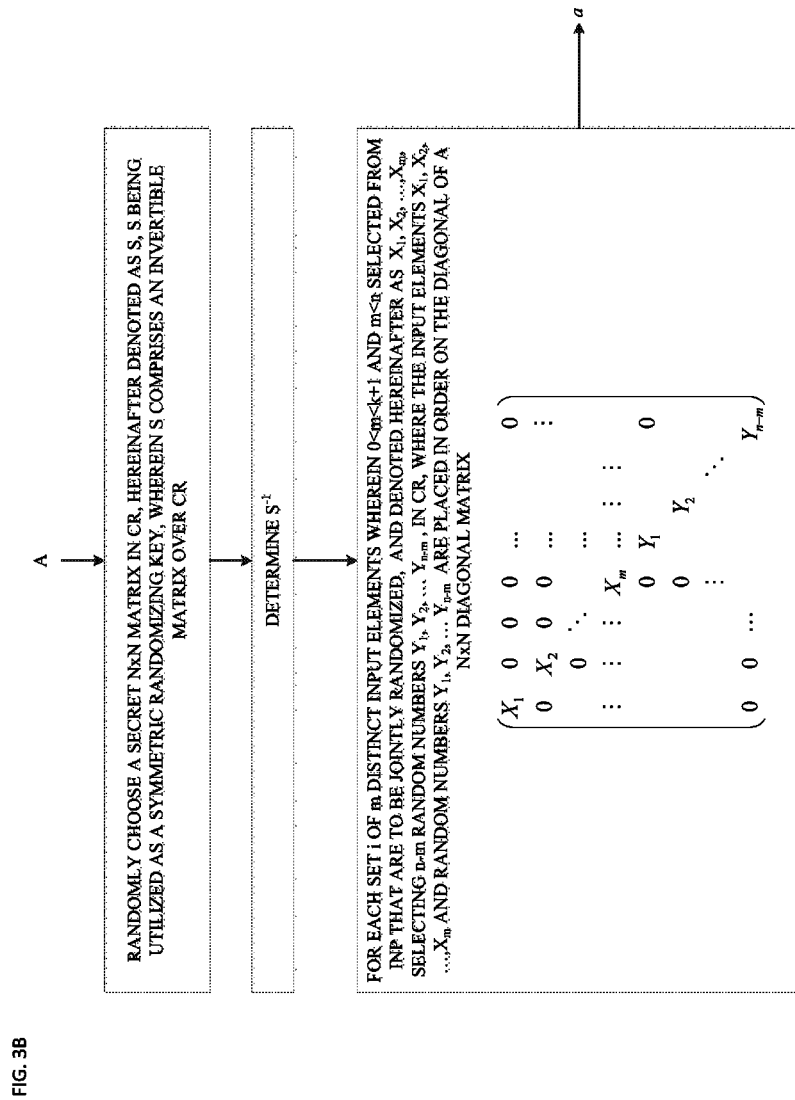
Figure 3D:
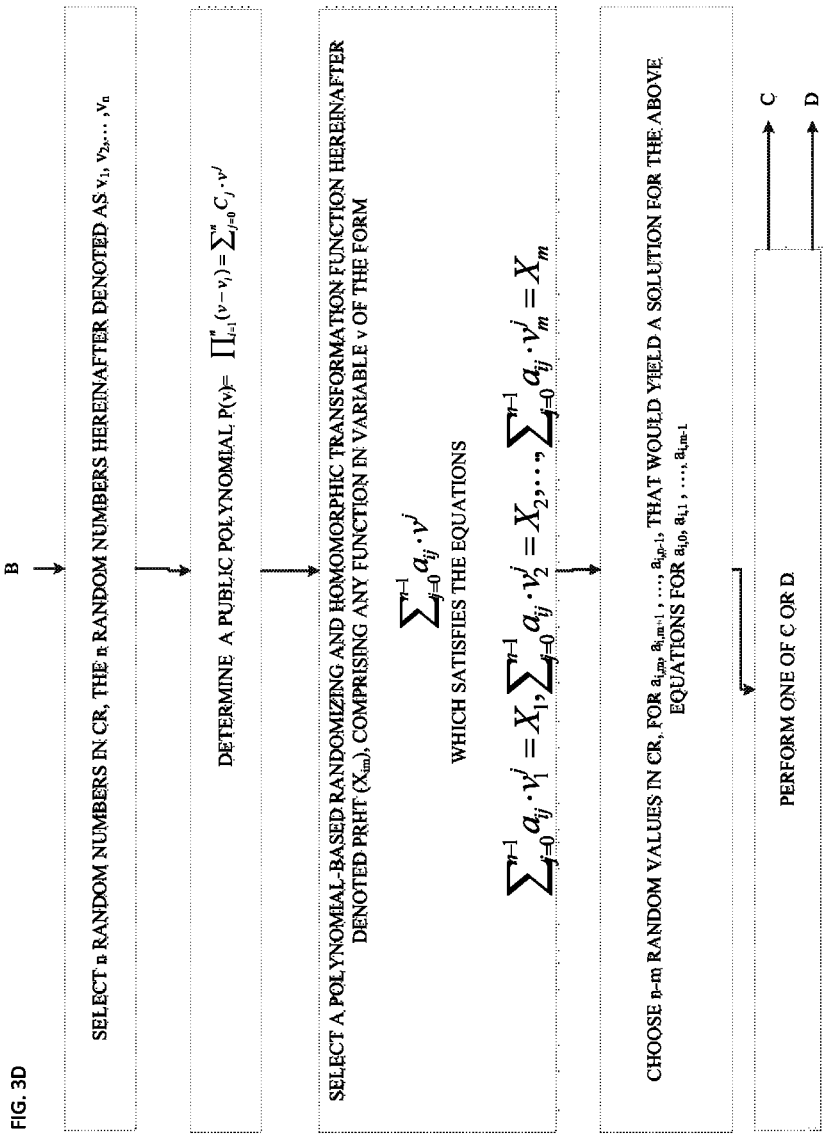
Figure 3E:
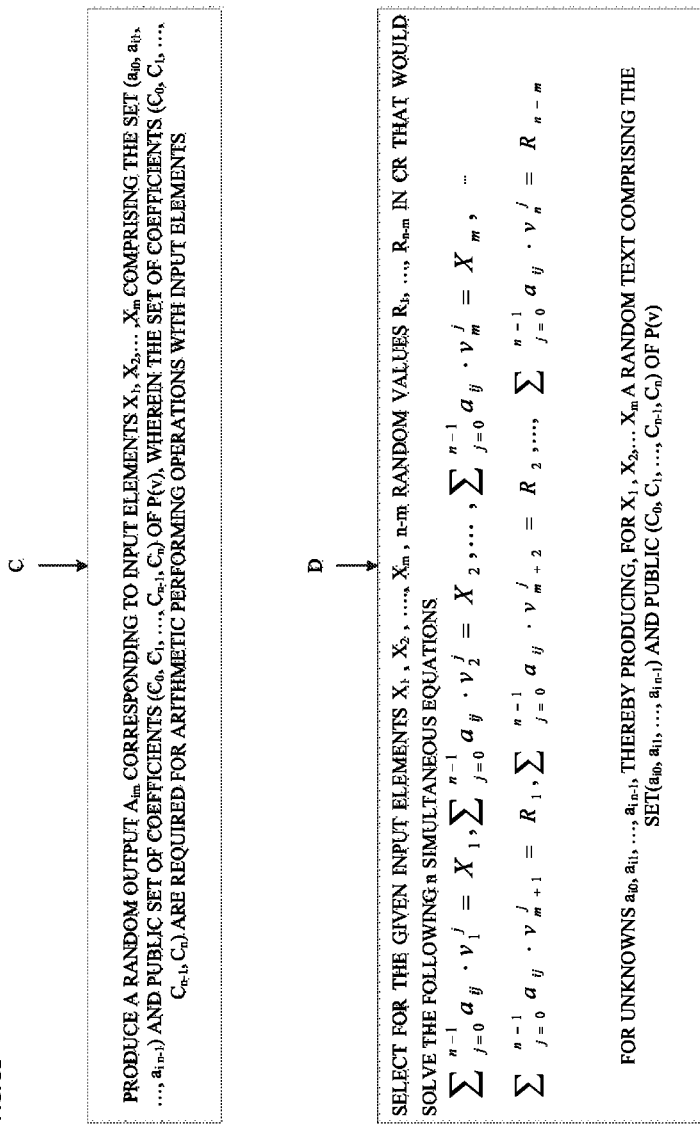

Reference is made to FIG. 1, which is a simplified depiction of a low security high performance device interacting with a high security low performance device constructed and operative in accordance with an embodiment of the present invention.

As noted above, the present provides several embodiments of non-deterministic fully homomorphic methods for:

Practical (highly efficient) fully homomorphic:

A. Symmetric randomization of any data in a commutative ring, CR;

B. Symmetric Encryption of special data, (mod-N in $Z_N$); and

C. Coupling of computations

The present application describes the following embodiments of the present invention:

Randomization of Any Data

In this case the data and operations are over CR. The application of the method to the data results in Randomized and Homomorphic Transformation (RHT) of the data. The result can be an input to a polynomial function consisting of additions and multiplications, e.g., AES algorithms that run within a silicon chip. Application of RHT to the secret AES key protects against Side Channel Attacks (e.g., Differential Power Attack) aimed at revealing the clear AES-key.

Efficient Homomorphic Encryption of Mod-N Numbers in $Z_N$

Secure use in open untrusted platforms of both:

secrets (symmetric keys); and a family of private algorithms.

Examples are a keyed-hash (where the key is secret), and a Private-Function for Key-Generation (PFKG) whose input is public (e.g., a broadcast ECM (entitlement control message) is processed by a secret PFKG running in the STB; or a comparable component in the smart card). The private function can be any polynomial with secret coefficients (and a0=0).

Most of the security workload will be carried out by a low-security host while the homomorphic-encryption key is kept by a Low-performance High-security component.

Enhanced protection for certain algorithms, e.g., securing OSS (public key) signature from Pollard attacks.

Coupling of Computations

Verification of computational integrity is provided by utilizing inseparable coupling, i.e., entanglement, of parallel, multiple independent computations, thereby providing protection against fault attacks.

I. Definitions

N is a number which is a product of two primes P and Q; (for security reasons P and Q are presumed secret); it is assumed that factoring N into primes is a computationally difficult problem).

The message X to be encrypted consists of a sequence of k modulo N numbers $X_1, X_2, X_m$ in $Z_N$.

$Z_N$ is the ring of residues modulo N.

CR is a commutative ring.

$M_{n \times n}$ ($Z_N$) is the ring of n×n matrices over $Z_N$.

$P(v) = \Pi_{i=1}^{n}(v-v_i) = \Sigma_{j=0}^{n} {}^nC_j \cdot v^j$ ($C_n=1$) over $Z_N$ where $Z_N[v]/P(v)$ is the polynomial ring mod $P(v)$.

In general, the method uses one $X_i$ per method application to allow for computation of (arbitrary) multivariate input in functions whose operations are addition, multiplication and division. However, if, for example, there are two known multivariate functions with two distinct sets of inputs—($X_1$, $X_2, \ldots, X_h$) and ($X_{h-1}, X_{h+2}, \ldots, X_L$), then no pair of variables in each of the input sets shall be encrypted (or randomized) jointly, i.e., with a single application of the method. In general, the methods discussed herein are discussed under the presumption of one variable.

Additionally, it is appreciated that the method described herein may be run on dedicated software, dedicated hardware, non-dedicated hardware, or some combination thereof. For example, and without limiting the generality of the foregoing, steps which are described herein as "receiving an input" may be operative to run in software which is running on appropriate hardware. Alternatively, the step of receiving an input may be running in a dedicated circuit of a specialized chip. Further alternatively, there may be a hardware based processor which can, for certain operations be utilized to run the steps of "receiving an input". The same would be true of the other steps described in the various methods and procedures described herein.

II. Fully Homomorphic Randomization of Arbitrary Data

The randomization of arbitrary data over CR is presumed to take place in a secure environment as it is not considered a strong encryption. One of its purposes is to thwart side-channel attacks on algorithm execution to get information on sensitive data such as symmetric cipher keys, e.g., an AES encryption key. Such attacks presume that the secret data, e.g., the key, is static over repeated runs of the AES algorithm to cumulatively glean information of the key and the attack also assumes that the attacker knows the inputs processed by the algorithm (or, alternatively, the outputs produced as the outcome of the algorithm). However, in this non-deterministic approach the randomized-key changes per cipher run thereby foiling such attack. (The inputs to the algorithm are randomized and therefore operations are carried over randomized values. The algorithm manipulates only randomized data and randomized keys, the data manipulated by the algorithm is not exposed outside the boundaries of the secure environment. Data which is exposed outside of the secure environment is data which has already been derandomized according to the methods disclosed herein.)

By way of example, randomization may be useful to thwart side channel attacks, for example, and without limiting the generality of the foregoing, differential power analysis (DPA) attacks. DPA is a concrete example of a side channel attack. DPA requires interaction between unknown key-bits and known data-bits. The attacker chooses and inputs the data bits into the cipher, and learns about their interaction with the key-bits by measuring the electrical current that the enciphering device consumes. Then by using statistical methods, the attacker can retrieve the key-bits previously unknown to him.

Randomization may also be useful against fault attacks. Fault attacks rely on the attacker's ability to induce a fault into the cryptographic computation. Then the attacker observes the results of the faulty computation, compares it to the results of non-faulty computations and attempts to deduce the value of unknown key-bits.

Randomized and homomorphic transformation (RHT)—is a transformation T (and its inverse $T^{-1}$) which allows simple operations (e.g., addition, multiplication) on transformed data. The transformation is randomized since it takes an input value, appends to it random data, and then applies the transformation to it. The transformation is referred to as 'homomorphic' because it allows operations in the transformed domain (although the operations themselves are also transformed). Consider an input value X, then T(X, r) randomizes X with r, and transforms it. RHT should satisfy:

$$X+Y=T^{-1}(T(X,r1)+T(Y,r2)) \text{ and}$$

$$X*Y=T^{-1}(T(X,r1)*T(Y,r2)).$$

In an embodiment of the present invention for countering side channel attacks by using the randomization property of RHT, the homomorphic property provides for secure and efficient protection as there is no need to successively remove errors due to computation with randomized data.

Additionally RHT computes two or more values in a single inseparable step (i.e. any impact on one of the values will perforce impact the second value).

Furthermore, fault attacks may be countered using the computational coupling of RHT:

RHT can be done for a homomorphic evaluation of a function requiring a secure environment for its execution; and RHT can be applied for a homomorphic algorithm that requires no secure execution. The main application is for the data to be randomized, i.e., statistically 'flattened'.

Therefore, for all computations are over CR, the method of fully homomorphic randomization of arbitrary data comprises:

receiving an input denoted X comprising a sequence of k input elements $X_1, X_2, X_3, \ldots, X_i, \ldots, X_k$ in CR and then performing one of the following:

Matrix Method

The most generalized statement of the matrix method is:

An input, denoted INP, is received. INP comprises a sequence of k input elements in CR.

A secret n×n matrix is selected in CR, the matrix hereinafter being denoted S, wherein S is utilized as a symmetric randomizing key. S comprises an invertible matrix over CR. $S^{-1}$ is determined.

For each set i of m distinct input elements wherein 0<m<k+1 and m<n selected from INP that are to be jointly randomized, and denoted hereinafter as $X_{i1}, X_{i2}, \ldots, X_{im}$, wherein $X_{i1}, X_{i2}, \ldots, X_{im}$ comprise any subset of input elements $X_1, X_2, X_3, \ldots, X_i, \ldots, X_k$. For ease of discussion, the input elements discussed hereinafter are denoted as $X_1, X_2, X_3, \ldots, X_m$.

Additionally, n−m (n minus m) random numbers $Y_1, Y_2, \ldots, Y_{n-m}$, are selected in CR for each input set of i of m distinct elements, where the input elements $X_1, X_2, \ldots, X_m$ and random numbers $Y_1, Y_2, \ldots, Y_{n-m}$ are placed in order on the diagonal of a n×n diagonal matrix:

$$\begin{pmatrix} X_1 & 0 & & & & \cdots & \cdots & \cdots & 0 \\ 0 & X_2 & 0 & & & & & \cdots & \vdots \\ \vdots & 0 & \ddots & 0 & & & & \cdots & \\ & & \ddots & X_m & 0 & \cdots & & & \\ & & & 0 & Y_1 & \ddots & & \cdots & 0 \\ \vdots & & & & \vdots & 0 & Y_2 & 0 & \\ & & & & & \vdots & \ddots & \ddots & 0 \\ 0 & 0 & \cdots & & & & & 0 & Y_{n-m} \end{pmatrix}$$

Random output $A_{im}$ is determined for the m input elements in set i denoted as $\{X_{im}\}=X_1, X_2, \ldots, X_m$, by utilizing a matrix-based randomizing and homomorphic transformation function hereinafter denoted MRHT, wherein:

$$MRHT(\{X_{im}\}) =$$

$$A_{im} = S \begin{pmatrix} X_1 & 0 & & & & \cdots & \cdots & \cdots & 0 \\ 0 & X_2 & 0 & & & & & \cdots & \vdots \\ \vdots & 0 & \ddots & 0 & & & & \cdots & \\ & & \ddots & X_m & 0 & \cdots & & & \\ & & & 0 & Y_1 & \ddots & & \cdots & 0 \\ \vdots & & & & \vdots & 0 & Y_2 & 0 & \\ & & & & & \vdots & \ddots & \ddots & 0 \\ 0 & 0 & \cdots & & & & & 0 & Y_{n-m} \end{pmatrix} S^{-1} \begin{pmatrix} a_{11} & \cdots & a_{1n} \\ \vdots & \ddots & \vdots \\ a_{n1} & \cdots & a_{nn} \end{pmatrix}$$

thereby producing a random output $A_{im}$ corresponding to the i set of m input elements $\{X_{im}\}=X_1, X_2, \ldots, X_m$.

Those skilled in the art will appreciate that trivial variations of the matrix (denoted M):

$$M = \begin{pmatrix} X_1 & 0 & & & & \cdots & \cdots & \cdots & 0 \\ 0 & X_2 & 0 & & & & & \cdots & \vdots \\ \vdots & 0 & \ddots & 0 & & & & \cdots & \\ & & \ddots & X_m & 0 & \cdots & & & \\ & & & 0 & Y_1 & \ddots & & \cdots & 0 \\ \vdots & & & & \vdots & 0 & Y_2 & 0 & \\ & & & & & \vdots & \ddots & \ddots & 0 \\ 0 & 0 & \cdots & & & & & 0 & Y_{n-m} \end{pmatrix}$$

such as:

dispersing constants among the values on the diagonal; and changing the order (i.e. intermixing the $X_i$s and the $Y_i$s), will not change the basic method as defined herein. By way of example, and without limiting the generality of the foregoing, the following may all be exemplary trivial variations of the matrix:

The diagonal is: $X_1, X_2, \ldots X_m, 0, Y_1, Y_2, \ldots, Y_m$.

The diagonal is: $X_1, 0, X_2, 0, \ldots X_m, 0, Y_1, 0, Y_2, 0, \ldots Y_m, 0$.

The diagonal is: $X_1, Y_1, X_2, Y_2, \ldots X_m, Y_m$.

Additionally, adding rows and columns with zeros around the matrix diagonal, i.e.:

$$\begin{pmatrix} X_1 & 0 & & & & \cdots & \cdots & \cdots & 0 \\ 0 & X_2 & 0 & & & & & \cdots & \vdots \\ \vdots & 0 & \ddots & 0 & & & & \cdots & \\ & & \ddots & X_m & 0 & \cdots & & & \\ & & & 0 & Y_1 & \ddots & & \cdots & 0 \\ & & & & \vdots & 0 & \ddots & 0 & \\ \vdots & & & & & \vdots & \ddots & Y_{n-m} & 0 \\ 0 & 0 & \cdots & & & & & 0 & 0 \end{pmatrix}$$

would also be a trivial variation which will not change the basic method as defined herein.

A less generalized statement of the matrix method is:

for each input element $X_i$, selecting n−1 random numbers $Y_1, Y_2, \ldots Y_{n-1}$, in CR, where the input element $X_i$ and random numbers $Y_1, Y_2, \ldots Y_{n-1}$ are placed in order on the diagonal of a n×n diagonal matrix;

a secret n×n matrix in CR is randomly chosen, the secret n×n matrix hereinafter denoted as S, S being utilized as a symmetric randomizing key, wherein S comprises an invertible matrix over CR;

determining $S^{-1}$; and a random output A, is determined for input element $X_i$ by utilizing a matrix-based randomizing and homomorphic transformation function, method hereinafter denoted MRHT, wherein:

$$MRHT(X_i) = A_i = S \begin{pmatrix} X_i & 0\ldots & & 0 \\ \vdots & \vdots & & \vdots \\ 0\ldots & Y_i\ldots & & 0 \\ \vdots & \vdots & & \vdots \\ 0\ldots & 0\ldots & & Y_{n-1} \end{pmatrix} S^{-1} = \begin{pmatrix} a_{11} & \cdots & a_{1n} \\ \vdots & \ddots & \vdots \\ a_{n1} & \cdots & a_{nn} \end{pmatrix}$$

thereby producing a random output $A_i$ corresponding to input element $X_i$.

It is appreciated that the above method may be generalized. Instead of selecting n−1 random numbers $Y_1, Y_2, \ldots Y_{n-1}$, in CR for an input element $X_i$, for a set of m (where $1 \leq m \leq k$; and m<n) input elements, n−m random numbers $Y_1, Y_2, \ldots Y_{n-m}$ are selected.

Polynomial Method

The most generalized statement of the polynomial method is:

n random numbers in CR are selected, the n random numbers hereinafter denoted as $v_1, v_2, \ldots, v_n$;

a public polynomial $P(v) = \Pi_{i=1}^{n}(v-v_i) = \Sigma_{j=0}^{n} C_j \cdot v^j$ ($C_n=1$) is determined;

for each set i of m distinct input elements wherein 0<m<k+1 and m<n selected from INP that are to be jointly randomized, and denoted hereinafter as $X_{i1}, X_{i2}, \ldots, X_{im}$, wherein $X_{i1}, X_{i2}, \ldots, X_{im}$ comprise any subset of input elements $X_1, X_2, X_3, \ldots, X_i, \ldots, X_k$. For ease of discussion, the input elements discussed hereinafter are denoted as $X_1, X_2, X_3, \ldots, X_m$;

a polynomial-based randomizing and homomorphic transformation function hereinafter denoted PRHT $(X_1, X_2, X_3, \ldots, X_m)$ is selected, comprising any function in variable v of the form $\Sigma_{j=0}^{n-1} a_{ij} \cdot v^j$ which satisfies the equation $\Sigma_{j=0}^{n-1} a_{ij} \cdot v_1^j = X_1, \Sigma_{j=0}^{n-1} a_{ij} \cdot v_2^j = X_2, \ldots, \Sigma_{j=0}^{n-1} a_{ij} \cdot v_m^j = X_m$;

n−m (n minus m) random values are chosen in CR, for $a_{i,m}, a_{i,m+1}, \ldots, a_{i,n-1}$, that would yield a solution for the above equations for $a_{i,0}, a_{i,1}, \ldots, a_{i,m-1}$; and then one of the following is performed:

a random output $A_{im}$ corresponding to input elements $X_1$, $X_2, \ldots, X_m$ is produced wherein $A_{im}$ comprises comprising the set $(a_{i0}, a_{i1}, \ldots, a_{i\,n-1})$ and public set of coefficients $(C_0, C_1, \ldots, C_{n-1}, C_n)$ of $P(v)$, wherein the set of coefficients $(C_0, C_1, \ldots, C_{n-1}, C_n)$ are required for arithmetic performing operations with input elements; and for the given input elements $X_1, X_2, \ldots, X_m$, n–m (n minus m) random values $R_1, \ldots, R_{n-m}$ are selected in CR that would solve the following n simultaneous equations:
$\Sigma_{j=0}^{n-1}a_{ij}\cdot v_1^j=X_1$, $\Sigma_{j=0}^{n-1}a_{ij}\cdot v_2^j=X_2, \ldots,$
$\Sigma_{j=0}^{n-1}a_{ij}\cdot v_m^j=X_m$, $\Sigma_{j=0}^{n-1}a_{ij}\cdot v_{m+1}^j=R_1$, $\Sigma_{j=0}^{n-1}a_{ij}\cdot v_{m+2}^j=R_2, \ldots, \Sigma_{j=0}^{n-1}a_{ij}\cdot v_n^j=R_{n-m}$ for unknowns $a_{i0}, a_{i1}, \ldots, a_{i\,n-1}$, thereby producing, for $X_1, X_2, \ldots X_m$ a random text comprising the set $(a_{i0}, a_{i1}, \ldots, a_{i\,n-1})$ and public set $(C_0, C_1, \ldots, C_{n-1}, C_n)$ of $P(v)$.

A less generalized statement of the polynomial method is:
n random numbers in CR are selected, the n random numbers hereinafter denoted as $v_1, v_2, \ldots, v_n$;

a public polynomial $P(v)=\Pi_{i=0}^n(v-v_i)=\Sigma_{j=0}^n C_j \cdot v^j$ ($C_n=1$) is determined;

a polynomial-based randomizing and homomorphic transformation function hereinafter denoted PRHT $(X_i)$ is selected, comprising any function in variable v of the form $\Sigma_{j=0}^{n-1}a_{ij}\cdot v^j$ which satisfies the equation $\Sigma_{j=0}^{n-1}a_{ij}\cdot v_1^j=X_i$;

n–1 random values in CR are chosen, for $a_{i1}, a_{i2} \ldots, a_{i\,n-1}$, of $X_i$ thereby determining $a_{i0}=X_i-\Sigma_{=1}^{n-1}a_{ij}\cdot v_1^j$; and a randomized output corresponding to input element $X_i$ is produced, the random output comprising the set $(a_{i0}, a_{i1}, \ldots, a_{i\,n-1})$ and public set of coefficients $(C_0, C_1, \ldots, C_{n-1}, C_n)$ of $P(v)$, wherein the set of coefficients $(C_0, C_1, \ldots, C_{n-1}, C_n)$ are required for arithmetic performing operations with the input element $X_i$;

or, alternatively, selecting n–1 random values $R_{i1}, \ldots, R_{i\,n-1}$ in CR for the given $X_i$ and solving n simultaneous equations:
$\Sigma_{j=0}^{n-1}a_{ij}\cdot v_1^j=X_i$, $\Sigma_{j=0}^{n-1}a_{ij}\cdot v_2^j=R_{i1}, \ldots, \Sigma_{j=0}^{n-1}a_{ij}\cdot v_n^j=R_{i\,n-1}$ for unknowns $a_{i0}, a_{i1}, \ldots, a_{i\,n-1}$, thereby producing, as above, for $X_i$ a randomized text comprising the set $(a_{i0}, a_{i1}, \ldots, a_{i\,n-1})$ and public set $(C_0, C_1, \ldots, C_{n-1}, C_n)$ of $P(v)$.

By way of example, the input X is transformed into a 2×2 matrix M[x] as follows (S is a random, invertible matrix):

$$M[X] = S\begin{pmatrix} X & 0 \\ 0 & Y \end{pmatrix}S^{-1}$$

where the element Y ($\neq 0$) can be selected at random or selected to be a predefined value. Elements are added by matrix addition and multiplied by matrix multiplication. Note that popular cryptographic primitives such as the AES cipher can be easily expressed and calculated over the transformed elements described above, for example, and without limiting the generality of the foregoing, take the CR to be $F_{256}$ the extension field of degree eight over the field with two elements $F_2$ and express the AES operations as an algebraic operation over $F_{256}$. Note, however, that the actual, final result of the AES cipher must be extracted from the transformed elements (i.e., the matrices). This is done by decrypting the resulting matrix (i.e., multiplying M[x] by $S^{-1}$ from the left and by S from the right), and taking the upper left value as the actual resulting AES cipher text.

Countering DPA: When using a randomized transformation (i.e., Y is selected at random) for a cipher such as AES, the randomization is applied to both inputs—the key elements and the text elements. Since the attacker does not know the exact value of his transformed data elements (as they were randomized under the scheme), DPA can no longer work.

Countering fault attacks: The scheme has the property that it turns every operation on elements into an extended inseparable calculation over 2×2 matrices. Therefore by inserting specific pre-defined values for Y, one can verify that a computation like the AES cipher was carried out correctly without faults. This is done, e.g., by applying the matrix method with the preset Y, and then comparing the results in position Y to the expected result.

It is appreciated that the randomization of the input X comprises a successive application of a mix of functions PRHT($X_i$) and MRHT($X_i$), wherein: the randomization of the input X comprises a successive application of a mix of functions PRHT($X_i$) and MRHT($X_i$), wherein:

$$MRHT(PRHT(X_i)) = (MRHT(a_{i0}), MRHT(a_{i1}) \ldots, MRHT(a_{i\,n-1})) ==$$

$$\left( \begin{pmatrix} a_{11} & \cdots & a_{1n} \\ \vdots & \ddots & \vdots \\ a_{n1} & \cdots & a_{nn} \end{pmatrix}_{i0}, \begin{pmatrix} a_{11} & \cdots & a_{1n} \\ \vdots & \ddots & \vdots \\ a_{n1} & \cdots & a_{nn} \end{pmatrix}_{i1}, \ldots, \begin{pmatrix} a_{11} & \cdots & a_{1n} \\ \vdots & \ddots & \vdots \\ a_{n1} & \cdots & a_{nn} \end{pmatrix}_{i\,n-1} \right); \text{ and}$$

$$PRHT(MRHT(X_i)) = PRHT\left( \begin{pmatrix} a_{11} & \cdots & a_{1n} \\ \vdots & \ddots & \vdots \\ a_{n1} & \cdots & a_{nn} \end{pmatrix} \right) \text{ where } PRHT(a_{pj}) =$$

$$(a_{i0}, a_{i1}, \ldots, a_{i\,n-1})p_j,$$

therefore (bearing in mind that the index i of $X_i$ and in $a_{i0}, a_{i1}, \ldots, a_{i\,n-1}$ should not be confused with the index i in $a_{ij}$):

$$PRHT(MRHT(X_i)) = \begin{pmatrix} (a_{i0}, a_{i1}, \ldots, a_{i\,n-1})_{11} & \cdots & (a_{i0}, a_{i1}, \ldots, a_{i\,n-1})_{1n} \\ \vdots & \ddots & \vdots \\ (a_{i0}, a_{i1}, \ldots, a_{i\,n-1})_{n1} & \cdots & (a_{i0}, a_{i1}, \ldots, a_{i\,n-1})_{nn} \end{pmatrix}.$$

Derandomizing the Randomized Input

One of the following is performed:

Matrix Method

To derandomize a randomized input produced according to the most generalized matrix method of randomization given above:

an output comprising a randomized set of inputs, $\{X_{im}\}=X_1, X_2, \ldots, X_m$, is received, the input being an n×n diagonal matrix denoted hereinafter as $A_{im}$, over CR, where:

$$A_{im} = MRHT(X_{im})$$

$$= S \begin{pmatrix} X_1 & 0 & & & & & \cdots & \cdots & \cdots & 0 \\ 0 & X_2 & 0 & & & & & & \cdots & \vdots \\ \vdots & 0 & \ddots & 0 & & & & \cdots & & \\ & & \ddots & X_m & 0 & \cdots & & & & \\ & & & 0 & Y_1 & \ddots & \cdots & & & 0 \\ & & & & \vdots & 0 & Y_2 & 0 & & \\ \vdots & & & & & \vdots & \ddots & \ddots & 0 & \\ 0 & 0 & \cdots & & & & & 0 & Y_{n-m} \end{pmatrix} S^{-1}$$

$$= \begin{pmatrix} a_{11} & \cdots & a_{1n} \\ \vdots & \ddots & \vdots \\ a_{n1} & \cdots & a_{nn} \end{pmatrix}$$

S is used determine $$S^{-1} = \begin{pmatrix} s'_{11} & \cdots & s'_{1n} \\ \vdots & \ddots & \vdots \\ s'_{n1} & \cdots & s'_{nn} \end{pmatrix}$$

and determining $X_{im}$

Then, the following is performed:

$$S^{-1} \cdot A_i \cdot S = \begin{pmatrix} X_1 & 0 & & & & & \cdots & \cdots & \cdots & 0 \\ 0 & X_2 & 0 & & & & & & \cdots & \vdots \\ \vdots & 0 & \ddots & 0 & & & & \cdots & & \\ & & \ddots & X_m & & 0 & \cdots & & & \\ & & & 0 & Y_1 & \ddots & \cdots & & & 0 \\ & & & & \vdots & 0 & Y_2 & 0 & & \\ \vdots & & & & & \vdots & \ddots & \ddots & 0 & \\ 0 & 0 & & \cdots & & & & 0 & Y_{n-m} \end{pmatrix}$$

where $X_1, X_2, \ldots, X_m$ is in the upper left element of the matrix,

Equivalently the following formula can be used for more efficient computation to determine $$X_i = (1/s'_{i1}) \cdot \Sigma_{j=1}^n a_{j1} \cdot s'_{ij} \text{ for } i=1, \ldots m.$$

To derandomize a randomized input produced according to the less generalized statement of the matrix method given above:

An output comprising a randomized $X_i$, and the input being an n×n diagonal matrix denoted hereinafter as $A_i$, over $Z_N$, where:

$$A_i = MRHT(X_i) = S \begin{pmatrix} X_i & 0 & \cdots & 0 \\ \vdots & \vdots & & \vdots \\ 0 & \cdots & Y_l & \cdots & 0 \\ \vdots & \vdots & & \vdots \\ 0 & \cdots & 0 & \cdots & Y_{n-1} \end{pmatrix} S^{-1} = \begin{pmatrix} a_{11} & \cdots & a_{1n} \\ \vdots & \ddots & \vdots \\ a_{n1} & \cdots & a_{nn} \end{pmatrix}$$

S is used to determine $$S^{-1} = \begin{pmatrix} s'_{11} & \cdots & s'_{1n} \\ \vdots & \ddots & \vdots \\ s'_{n1} & \cdots & s'_{nn} \end{pmatrix}$$

Xi is determined by performing one of:

$$S^{-1} \cdot A_i \cdot S = \begin{pmatrix} X_i & 0 & \cdots & 0 \\ \vdots & \vdots & & \vdots \\ 0 & \cdots & Y_l & \cdots & 0 \\ \vdots & \vdots & & \vdots \\ 0 & \cdots & 0 & \cdots & Y_{n-1} \end{pmatrix}$$

where $X_i$ is the upper left element of the matrix, thereby determining $X_i = a_{11} + (1/s'_{11}) \cdot \Sigma_{j=2}^n a_{j1} \cdot s'_{1j}$; and $$X_i = (1/s'_{i1}) \cdot \Sigma_{j=1}^n a_{i1} \cdot s'_{1j}.$$

Polynomial Method

To derandomize a randomized input produced according to the most generalized polynomial method of randomization given above:

The randomized output for $\{X_i\}$ is received as $(a_{i0}, a_{i1}, \ldots, a_{i\ n-1})$ and $v_1 \ldots v_m$, are used to determine the derandomized input $\Sigma_{j=0}^{n-1} a_{ij} \cdot v_1^j = X_1$, $\Sigma_{j=0}^{n-1} a_{ij} \cdot v_2^j = X_2, \ldots, \Sigma_{j=0}^{n-1} a_{ij} \cdot v_m^j = X_m$.

To derandomize a randomized input produced according to the less generalized statement of the polynomial method given above:

The randomized output for $X_i$ is received as $(a_{i0}, a_{i1}, \ldots, a_{i\ n-1})$ and $v_1$, is used to determine the derandomized input $X_i = \Sigma_{j=0}^{n-1} a_{ij} \cdot v_1^j$.

Arithmetic Property of Fully Homomorphic Operations

Because the above methods are fully homomorphic, both additive and multiplicative properties are satisfied.

Additive Homomorphism:

$$RHT^{-1}(RHT(x)+RHT(y))=RHT^{-1}(RHT(x+y))=x+y \quad (1)$$

Multiplicative Homomorphism:

$$RHT^{-1}(RHT(x) \cdot RHT(y))=RHT^{-1}(RHT(x \cdot y))=x \cdot y \quad (2)$$

In addition, the methods above are homomorphic for a division operation:

$$RHT^{-1}(RHT(x)/RHT(y))=RHT^{-1}(RHT(x/y))=x/y \quad (3)$$

Addition and multiplication of randomized values are defined by the addition and multiplication, respectively, of the corresponding matrices and polynomials.

Matrix Method

Addition and multiplication of randomized values are defined by the addition and multiplication, respectively, of the corresponding A matrices.

for $X_i$ comprising MRHT $(X_i)=A_i$:

$$MRHT(X_1)+MRHT(X_2)=A_1+A_2; \text{ and}$$

$$MRHT(X_1) \cdot MRHT(X_2)=A_1 \cdot A_2.$$

For division, if $X_2 \neq 0$ and $MRHT^{-1}(MRHT(X_2) \neq 0$, then $MRHT(X_1/X_2)$ is calculated by $MRHT(X_1) \cdot (MRHT(X_2))^{-1} = A_1 \cdot A_2^{-1}$ $$1/MRHT(X_2)=A_2^{-1} \text{ and}$$

$$MRHT(X_1)/MRHT(X_2)=A_1 \cdot A_2^{-1}$$

Polynomial Method

Addition and multiplication of randomized values are defined by the addition and multiplication, respectively, of the corresponding linear functions in $Z_N[v]/P(v)$.

Given $PRHT(X_1)=(m_1; d_1)$, $PRHT(X_2)=(m_2; d_2)$ and $P(v)=v^2+bv+c$, then for:

Addition: $PRHT(X_1)+PRHT(X_2)=(m_1+m_2; d_1+d_2)$; and

Multiplication: $PRHT(X_1) \cdot PRHT(X_2)=((m_1 \cdot d_2+m_2 \cdot (d_1-b \cdot m_1)); (d_1 \cdot d_2-c \cdot m_1 \cdot m_2))$ Note, $(PRHT(X_1))^2=(m_1 \cdot (2d_1-b \cdot m_1); (d_1+\sqrt{c} \cdot m_1) \cdot (d_1-\sqrt{c} \cdot m_1))$ $PRHT(X_1)=a_{10}, a_{11}, \ldots, a_{1\ n-1}$ and $PRHT(X_2)=a_{20}, a_{21}, \ldots, a_{2\ n-1}$ and $C_0, C_1, \ldots, C_{n-1}, C_n$ of $P(v)=\Sigma_{j=0}^n C_j \cdot v^j$ ($C_n=1$); and $PRHT(X_1)+PRHT(X_2)=a_{10}+a_{20}, a_{11}+a_{21}, \ldots, a_{1\ n-1}+a_{2\ n-1}$ For division, let $D=(m_2)^2 \cdot c - d_2 \cdot (m_2 \cdot b + d_2)$ $PRHT(X_1)/PRHT(X_2)=((m_1 \cdot (d_2-m_2 \cdot b)-m_2 \cdot (d_1-b \cdot m_1))/D; (d_1 \cdot (d_2-m_2 \cdot b)+c \cdot m_1 \cdot m_2)/D)$ Therefore, for $PRHT(X_1)=a_{10}, a_{11}, \ldots, a_{1\ n-1}$ and $PRHT(X_2)=a_{20}, a_{21}, \ldots, a_{2\ n-1}$ and $C_0, C_1, \ldots, C_{n-1}, C_n$ of $P(v)=\Sigma_{j=0}{}^n C_j \cdot v^j$ ($C_n=1$), can be determined $1/PRHT$ $(X_2)=u_{20}, u_{21}, \ldots, u_{2\,n-1}$ by calculating $((\Sigma_{j=0}{}^{n-1} u_{2j} \cdot v^j) \cdot (\Sigma_{j=0}{}^{n-1} a_{2j} \cdot v^j)) \bmod \Sigma_{j=0}{}^n C_j \cdot v^j = 1$ in terms of n unknown coefficients $u_{2j}$, ($j=0, \ldots, n-1$), thereby determining $$\sum_{j=0}^{n-1} g_{2j}(u_{20}, u_{21}, \ldots, u_{2n-1}, a_{10}, a_{21}, \ldots, a_{2n-1}, c_{10}, c_{21}, \ldots, c_{2n-1},) \cdot v^j$$

wherein $g_{2j}(\ )$ is a linear combination of a plurality of n unknowns $u_{2j}$; and solve the system of n derived equations $g_{20}(\ )=1$, and $g_{2j}(\ )=0$ for $j=1, \ldots, n-1$ for all $u_{2j}$ $j=0, \ldots, n-1$; and $$PRHT(X_1)/PRHT(X_2)=PRHT(X_1)\cdot(1/PRHT(X_2))= \\ ((\Sigma_{j=0}{}^{n-1} a_{1j}\cdot v^j)\cdot(\Sigma_{j=0}{}^{n-1} u_{2j}\cdot v^j))\bmod \Sigma_{j=0}{}^n C_j\cdot v^j.$$

III. Fully Homomorphic Encryption of Mod-N Numbers

The plain text X is a sequence of k modulo N elements $X_1, X_2, \ldots X_k$.

Both the matrix-based method and polynomial-based method are equivalent in their utility but some implementation and performance differences exist.

Only one modular multiplication is required for encryption and decryption of the polynomial method where encryption using the matrix method requires more multiplications.

It is appreciated that the method of encryption is a special case of the fully homomorphic randomization of arbitrary data method described above. In the encryption of a mod-N number, the input comprises a plain text, the output comprises a cipher text, and all computations are performed modulo N over a ring $Z_N$, where N is a product of two prime numbers, and matrix S comprises symmetric encryption key. Encryption functions MEnc (Matrix method Encryption) and PEnc (Polynomial method Encryption) correspond to MRHT and PRHT, respectively. It is appreciated that N need not necessarily be a product of two prime numbers as discussed above, and any N may be used. For security reasons, however, it is preferably that N be a product of two prime numbers (as noted above). Alternatively, P and Q may be any numbers, provided that P and Q are approximately as large as the square root of N, and thus, security considerations will be satisfied.

Matrix Method

By way of example, consider a case where the n×n matrix is a 2×2 matrix where one input element $X_i$ is the plaintext and one corresponding random value $Y_i$ is selected, and a secret randomly chosen 2×2 matrix denoted S over $Z_N$ is selected to be the symmetric encryption key. S is selected to be an invertible matrix over $Z_N$, that is $Det(S) \neq 0$.

$S^{-1}$ is then determined

The encryption of X is defined over its components $X_i$ as follows: $Enc(X)=(Enc(X_1), \ldots, Enc(X_k))$.

Encryption of Xi is defined as follows:

$$A_1 = Enc(X_i) = S \begin{pmatrix} X_i & 0 \\ 0 & Y_i \end{pmatrix} S^{-1},$$

where all operations are mod N.

The encryption function yields $A_i$, the cipher text for input element $X_i$; $A_i$ is a 2×2 matrix over $Z_N$.

Polynomial Method

By way of example, consider a case where the polynomial is a quadratic equation. Two mod N secret random numbers, v1 and v2 are selected. The public polynomial $P(v)=(v-v1)\cdot(v-v2) \bmod N=v^2+b\cdot v+c$ is computed. Encryption of $X_i$, Enc ($X_i$), is any linear function in variable v of the form $m_i\cdot v+d_i$ satisfying $m_i\cdot v_1+d_i=X_i$.

A number mod N random for the $m_i$ value is selected. The linear equation $m_i\cdot v_i+d_i=X_i$ for $d_i=X_i-m_i\cdot v_1$ is solved. It is appreciated that all calculations are mod N. The cipher text consists of the pair ($m_i$, $d_i$) and b and c, the coefficients of P(v).

Alternatively, a random $Y_i$ is selected for a given $X_i$. The following simultaneous equations are solved for unknowns $m_i$ and $d_i$:

$$m_i\cdot v_1+d_i=X_i, \text{ and}$$

$$m_i\cdot v_2+d_i=Y_i$$

The result: $m_i=(X_i-Y_i)/(v1-v2)$, and $d_i=X_i-m_i\cdot v_1=(Y_i\cdot v_1-X_i\cdot v_2)/(v_1-v_2)$ is the plain text.

It is appreciated that the alternative is computationally heavier than the first alternative embodiment, and is useful when Yi is needed independent-of and well-ahead of Xi.

It is appreciated that the methods described above for combining the matrix and polynomial randomization methods above are applicable to the encryption method herein, as it was noted, the method of encryption is a special case of the fully homomorphic randomization of arbitrary data method.

Decryption

The derandomization method detailed above is performed, however, the received output comprises a cipher text denoted C, the cipher text C being produced according to the encryption method above, and the derandomized input comprises a plain text, and all computations are performed modulo N over a ring $Z_N$, where N is a product of two prime numbers, and matrix S comprises symmetric encryption key. Only one modular multiplication is required.

Matrix Method

To decrypt the encryption using the exemplary 2×2 matrix above where the cipher text A is 2×2 diagonal matrix over $Z_N$, let the vector (1, e) be an eigenvector of the matrix:

$$A = S \begin{pmatrix} X & 0 \\ 0 & Y \end{pmatrix} S^{-1},$$

satisfying: (1, e)A=(X, e·X).

Decrypt A as follows:

$X=A_{1,1}+e\cdot A_{2,1}$ (Mod N) where $e=(-S_{12}/S_{22}) \bmod N$, and $A_{ij}$ and $S_{ij}$ are the ij elements of matrix S and A, respectively.

Polynomial Method

The cipher text of Xi is the pair ($m_i$, $d_i$) (representing the linear function $m_i v+d_i$). The decryption of the cipher text is as follows: $m_i\cdot v_1 d_i+=X_i$.

It is appreciated that because the above encryption methods are fully homomorphic, the additive, multiplicative, and divisive properties described above are satisfied.

Security In Open Untrusted Platforms

For remote computing in an untrusted platform three cases defining the secrets in a model of an input and function (algorithm) are considered:

a. Only the input is private (not the algorithm)—The algorithm is characterized as a public polynomial whose input is homomorphically-encrypted data as in a keyed-hash where only the key is secret. In general the computed polynomial may have a multivariate input b. Only the algorithm is private (not the input)—The algorithm is characterized by a polynomial with some of the polynomial's coefficients are mod N-numbers secrets and the input is public. An example as mentioned above could be a PFKG (Private Function Key Generation) whose input is a public ECM used in broadcast CA systems. Yet another similar example is a private HMAC (hash-based message authentication code) depicted in FIG. 2, which is a depiction of an embodiment of the system of FIG. 1 where a private algorithm and a public input are used, a polynomial with mod N homomorphic-encrypted coefficients. The HMAC securely runs on an open machine; the last step in its process is delivered to the secure client for verification.

c. Both the algorithm and input are private—Neither the algorithm nor its input are known to the processing entity. (Note that both the algorithm and its input must be encrypted with the same homomorphic-encryption key known by the entity that is authorized to know the input and the algorithm).

Such untrusted platform could be a public (open) cloud server, a set top box host, a mobile phone ACPU (application central processing unit), etc.; the decryption of the result is done by the secure client, e.g., smart card, SIM, RFID, or secure execution environment with secure OTP (one-time programmable memory) of a low performance device.

Enhanced Protection for Certain Algorithms—Securing OSS Signature Against Pollard Attacks The Original OSS (Ong, Schnorr, Shamir) scheme is a signature scheme based on a modular equation with two variables.

The following two variables modular equation is given: $X^2 - \mu Y^2 = M \pmod{N}$ wherein the public key consists of ($\mu$, N).

The private key $\epsilon$ is the square root $\mu$ modulo N $\epsilon^2 = \mu$ (mod N).

A signature of a message is a pair (X,Y) satisfying the above equation where M is the hash of the message.

One who knows $\epsilon$ can find a solution for the equation.

A random value r modulo N is selected, which defines X and Y as follows:

$$X = \frac{1}{2}\left(r + \frac{M}{r}\right); Y = \frac{1}{2\varepsilon}\left(r - \frac{M}{r}\right).$$

The OSS scheme is considered very efficient for the signer and the verifier.

OSS Signing requires 3 modular multiplications and one modular division, and verification requires 3 modular multiplications.

OSS Signing was, however, broken by Pollard, who presented an algorithm for finding solutions for the equation without having to know the factorization of N or the value of $\epsilon$.

A modification of the original OSS scheme based on the above modulo-N Homomorphic Encryption scheme is herein described.

Consider two modular equations:

$X_1^2 - \mu_1 Y_1^2 = M_1 \pmod{N}$ and $X_2^2 - \mu_2 Y_2^2 = M_2 \pmod{N}$

The values $\mu_1$, $\mu_2$ are secret. A random invertible 2×2 matrix S and define $$U = S\begin{pmatrix} \mu_1 & 0 \\ 0 & \mu_2 \end{pmatrix} S^{-1}$$

is selected to be the public key.

The private key is the matrix S and values $\epsilon_1$, $\epsilon_2$ the square roots of $\mu_1$, $\mu_2$ respectively.

To sign a message, the hash of the message is calculated and a matrix M in the dimension 2 subspace of matrices that commute with U is selected. M has the form $$M = S\begin{pmatrix} M_1 & 0 \\ 0 & M_2 \end{pmatrix} S^{-1}.$$

$M_1$ and $M_2$ are calculated (calculation of $M_1$ and $M_2$ require 2 modular multiplications) and two random modulo N numbers $r_1$, $r_2$ are selected. The values $X_1$, $X_2$, $Y_1$, $Y_2$ that solve the two modular equations with $M_1$ and $M_2$ are found and as in the original OSS.

The matrices A and B are defined:

$$A = S\begin{pmatrix} X_1 & 0 \\ 0 & X_2 \end{pmatrix} S^{-1}, B = S\begin{pmatrix} Y_1 & 0 \\ 0 & Y_2 \end{pmatrix} S^{-1}.$$

The signature is the matrices pair (A, B). The matrices A and B commutes with U, The subspace of all matrices that commutes with U has dimension 2, only two parameters of A and two parameters of B are required for the signature (total of 4 modulo N numbers).

The verifier recovers the missing elements of A and B (each one of the missing parameters is a known linear combination of the two parameters in the signature). The verifier calculates the hash of the message and defines M and verifies that: $A^2 - U \cdot B^2 = M$.

A simplified version of the scheme is when $M_1 = M_2$. In this case there is no need to calculate the matrix M, the modulo N number M is defined to be the hash of the message, the matrices A and B are defined the same as before and the verification of the signature is done by checking the equality $A^2 - U \cdot B^2 = M \cdot I$ The Modified OSS scheme protects against Pollard attack as the attack cannot be launched against matrices.

Note that although the above was presented in terms of the Matrix-method, an equivalent protection against Pollard attack can be presented using the Polynomial-method.

Low-Cost (Collaborative) Security Platforms

The logical components of a low cost collaborative security platform, $(LH)^2$, consisting of a low performance high security element and a low-security high performance host or server is depicted in FIG. 1. The idea is that a given security function or data can be performed under a homomorphic encryption in low (or no security) environment, e.g., public cloud server, while the homomorphic secret and its related light operation is performed in the low performance secure (low-cost) element.

An example is a PFKG private function for (content) key generation. The PFKG in its homomorphic-encrypted form runs in the host—low security STB (set top box) (and not in clear form in the SC (smart card) thus making the SC leaner)—with the broadcast ECM as its input. The output of the operation is the desired homomorphic-encrypted pre-hash content key. The SC receives the homomorphic-encrypted pre-hash content key and decrypts it to get the pre-hash content key. It then hashes it and sends it back to the host as the content key used in content decryption.

Thus the mechanism to generate the broadcast content key is protected from any attack on the host STB.

Verification of Computational Integrity

It is frequently necessary to verify that the party who performed a homomorphic computation on behalf of a secure client did in fact do the job correctly, i.e., the returned result is valid.

Denoting the received result to be verified as $R^*_M$ for a result returned using an MRHT or MEnc function hereinafter denoted as M, and the result being denoted $R^*_P$ for a result returned using a PRHT or PEnc function denoted as hereinafter P, then the result comprising a result of a homomorphic calculation denoted f performed on $A_1$, $A_2, \ldots, A_k$ wherein $A_i$ is equal to one of $M(X_i)$ and $P(X_i)$; $f(A_1, A_2, \ldots, A_k)$ is equal to one of: $M(f(X_1, X_2, \ldots, X_k)) = f(M(X_1), M(X_2), \ldots, M(X_k))$ and $P(f(X_1, X_2, \ldots, X_k)) = f(P(X_1), P(X_2), \ldots, P(X_k))$. The result of $f(A_1, A_2, \ldots, A_k)$ is in one of two forms:

Either $$M(f(X_1, X_2, \ldots, X_K)) = S \begin{pmatrix} f(X_1, X_2, \ldots, X_K) \ldots & 0 \ldots & 0 \\ \vdots & \vdots & \vdots \\ 0 \ldots & f(Y_{m1}, Y_{m2}, \ldots, Y_{mk}) \ldots & 0 \\ \vdots & \vdots & \vdots \\ 0 \ldots & 0 \ldots & f(Y_{n-1,1}, Y_{n-1,2}, \ldots, Y_{n-1,k}) \end{pmatrix} S^{-1} = R^*_M;$$

Or:

$f(A_1, A_2, \ldots, A_k)$ in the form of $a^*_0, a^*_1 \ldots, a^*_{n-1}, = R^*_P$.

in the case where the result is in the form of $R^*_M$:

$f(Y_{m1}, Y_{m2}, \ldots, Y_{mk})$, hereinafter denoted Q, is computed for some value, m, m=1, 2, . . . , n−1 where $Y_{mj}$ is the $m^{th}$ random value used in either randomizing or in encrypting $X_m$.

$R^*_M$ is then one of: decrypted; and derandomized using the decryption and derandomization techniques explained above, thereby determining $f(Y_{m1}, Y_{m2}, \ldots, Y_{mk})$, hereinafter denoted E, from the resulting matrix diagonal of the m+1 row of the matrix. E is then compared with Q. The result of the computation of f(Xi) is deemed valid if a match occurs.

Alternatively, in the case where the result is in the form of $R^*_P$:

$f(Y_{m1}, Y_{m2}, \ldots, Y_{mk})$, hereinafter denoted Q, is computed for some value, m, m=1, 2, . . . , n−1 where $Y_{mj}$ the $m^{th}$ random used in one of randomizing; and encrypting $X_m$.

$R^*_P$ is one of decrypted or derandomized, thereby determining:

$\Sigma_{j=0}^{n-1} a^*_j \cdot v_{m+1}{}^j = f(R_{m1}, R_{m2}, \ldots, R_{mk})$, denoted as E.

E is then compared with Q. The result of the computation of f(Xi) is deemed valid if a match occurs.

Matrix Mode Example

Although, as has been noted, the Matrix-method and Polynomial-method are equivalent, for the sake of illustration consider the matrix $$A = S \begin{pmatrix} X & 0 \\ 0 & Y \end{pmatrix} S^{-1}$$

as the cipher text of X (it is appreciated that the cipher text may be generalized as an N×N matrix); A is used in homomorphic computation of a function $f(A) = \text{Enc}(f(X)) = R^*$. The result $R^*$ is returned to the secure client for decryption of the form $$R = \begin{pmatrix} f(X) & 0 \\ 0 & f(Y) \end{pmatrix}$$

The secure client has pre-computed f(Y) and compares it with the f(Y) in R. A positive match ensures the client that f(X) is a valid result.

Those skilled in the art will appreciate that the above verification of computational integrity can be shown for the polynomial method as well.

Recently, Xiao published a paper entitled, An Efficient Homomorphic Encryption Protocol for Multi-User Systems, available at www.utdallas.edu/~ilyen/techrep/HPbound.pdf which proposes a solution for the homomorphic encryption problem. The inventors of the present invention are of the opinion that the above-mentioned paper presents a method based on 4×4 diagonal matrices where an arbitrary plaintext data and a nonce instantiate the diagonal; and the cipher text is represented through the application of a secret 4×4 matrix to the diagonal matrix.

The matrix-based method described herein (referred to as "MORE" in Appendix A) claims (see the proofs in the section entitled "Security" in Appendix A) that the use of diagonal commutative matrices over $Z_N$ is valid, i.e. secure, for homomorphic encryption for plaintext inputs $(x_1, x_2, \ldots, x_n)$ that are constrained, that is, selected uniformly and independently over $Z_N$; i.e., the $x_i$'s are randomly chosen in $Z_N$.

On the other hand, the reference mentioned above ("An Efficient Homomorphic Encryption Protocol for Multi-User Systems") presents a homomorphic encryption scheme for any (arbitrary) plaintext inputs, namely, the $(x_1, x_2, \ldots, x_n)$ are unconstrained both in size and statistical properties. The reference's claim for security of the scheme presented therein is incorrect.

It can be shown that:
for small-value plaintext inputs, (e.g., $x_i$<80 bytes); or
for plaintext values that are not statistically independent (e.g., $x1 = 3x_2 - 4(x_3)^2$),
the scheme presented in the "An Efficient . . . " reference is not secure and can be broken despite the reference's claim to security strength of factoring. As such, the scheme presented in the "An Efficient . . . " reference cannot be considered a valid encryption scheme as presented. Note that the attack described below works even when no known plaintext is available, and, more importantly, the attack will also work in the case of 4×4 scheme ("$E_4$") that is claimed to be secure in the known-plaintext model.

For the case of small-value plaintext inputs, (e.g., $x_i<80$ bytes): the encryption scheme is not secure and can be broken in practice i.e. once a sequence of n small-value plain text values is encrypted using the scheme proposed it is possible to recover the secret plain text values.

Suppose there is a sequence of n cipher text messages with plain texts: $x_1, \ldots x_n$ each one of which satisfies $x_i<2^{80\cdot 8}$ (i.e. $x_i<80$ bytes). Take N with conventional size, e.g., N is an integer with a base 2 representation of 1024 bit long.

Using the notation of the "An Efficient . . . " reference, the cipher text takes the form:

$$E(x_i) = k^{-1}\begin{pmatrix} x_i & 0 \\ 0 & R_i \end{pmatrix}k.$$

All matrices $E(x_i)$ reside in subspace of dimension 2, therefore there are two mod N numbers a and b such that for all $1 \leq i \leq n$ there are: $x_i = aE(x_i)_{1,1} + bE(x_i)_{1,2}$ mod N.

Consider the following lattice L of dimension n+2 spanned by the vectors:

$w_1 = (\alpha, 0, E(x_1)_{1,1}, \ldots, E(x_n)_{1,1})$
$w_2 = (0, \alpha, E(x_1)_{1,2}, \ldots, E(x_n)_{1,2})$
$w_3 = (0, 0, N, , 0, \ldots, 0, , 0)$
$w_4 = (0, 0, 0, , N, \ldots, 0, , 0)$
. . .
$w_{n+2} = (0, 0, 0, \ldots 0\ N)$ For sufficiently large n (e.g. n>4) and a correct choice for $\alpha \sim 2^{8\cdot 80}/N$, since $x_i$ are small enough the vector $(a\alpha, b\alpha, x_1 \ldots x_n)$ is the nonzero vector in L having the smallest norm (length) and any other nonzero vector in the lattice has much larger norm. These are sufficient to ensure that the LLL algorithm will result in finding the smallest non-zero element in a lattice.

The representation of the vector $w_{min}$ as an integer combination of the lattice base elements $w_1 \ldots, w_i, \ldots, w_{n+2}$ is unique and has the form:

$$w_{min} = aw_1 + bw_2 + \sum_{i=3}^{n+2} c_i w_i$$

Once $w_{min}$ is recovered the coefficients a, b are easily found using standard linear algebra and the required parameters are found.

As mentioned above, the relationship between the cipher text and the plain text is known: $x_i = aE(x_i)_{1,1} + bE(x_i)_{1,2}$ mod N and this enables an attacker to recover the plain text given the cipher text.

As a result the inventors of the present invention conclude that the proposed algorithm is not a secure encryption scheme for encrypting small plain text values.

For the case of plaintext values that are not statistically independent (e.g., $x1 = 3x_2 - 4(x_3)^2$):

It can be shown that for plaintext values that are not statistically independent (e.g., $x_1 = 3x_2 - 4(x_3)^2$), the scheme is not secure and can be broken despite the authors' claim to security strength of factoring.

The notations $E(x_1)$, $E(x_2)$, $E(x_3)$ are used for encrypted values of the plaintexts $x_1$, $x_2$, $x_3$ $$E(x_i) = k^{-1}\begin{pmatrix} x_i & 0 \\ 0 & R_i \end{pmatrix}k$$

for $1 \leq i \leq 3$. Assume that $x_1$, $x_2$, $x_3$ satisfy an algebraic relation: $x_1 = 3x_2 - 4(x_3)^2$ or $x_1 + 4(x_3)^2 - 3x_2 = 0$ then, it can be shown how the plain text can be recovered.

Since the scheme is homomorphic there is the following matrix relation:

$$E(x_1) - 3E(x_2) + 2(E(x_3))^2 = E(0) \text{ or}$$

$$E(x_1) - 3E(x_2) + 2(E(x_3))^2 = k^{-1}\begin{pmatrix} 0 & 0 \\ 0 & R \end{pmatrix}k$$

The values $R_1$, $R_2$, $R_3$ are chosen randomly and therefore the value R is not equal 0 with very high probability. Given that it is easy to find the subspace of all vectors mapped to (0,0) by the matrix $$k^{-1}\begin{pmatrix} 0 & 0 \\ 0 & R \end{pmatrix}k$$

using standard linear algebra techniques. any non zero vector in this one dimensional subspace $v_1$ is good $E(x_1) v_1 = x_1 \cdot v_1$; $E(x_2)v_1 = x_2 \cdot v_1$; $E(x_3)v_1 = x_3 \cdot v_1$ The alternative polynomial-based encryption method described herein provides great performance enhancement over the matrix method herein (from four large number multiplications to only one). Unlike the matrix method (where the algebraic operations of addition and multiplication are standard matrix operations), the polynomial performs the algebraic operations of addition and multiplication over a ring of polynomials modulo some special polynomial of degree 2 or higher.

Moreover:

a. the efficiency of the computation for arbitrary function of cipher texts (with additions and multiplications) is preserved (capped) by calculating the intermediate results modulo some special polynomial of degree 2 or above; and b. the efficiency of multiplication of cipher texts is improved over the matrix method.

Reference is now made to FIGS. 3A-3E, which are flowchart diagrams depicting methods for the various embodiments of the system of FIG. 1. FIGS. 3A-3E are believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for reducing information leakage in order to counter side channel attacks against a secure execution environment, the method comprising:

receiving at the secure execution environment a first input comprising a key comprising a sequence of k input elements in a commutative ring, CR, wherein the secure execution environment comprises a low performance security element supported by an untrusted high performance server;

receiving at the secure execution environment a second input comprising a text comprising a sequence of p input elements in the commutative ring, CR;

defining an input INP comprising a sequence of j input elements, wherein INP comprises either one or both of the first input or the second input;

performing by the secure execution environment either one of (a) or (b);

(a) randomly choosing a secret n×n matrix in CR, hereinafter denoted as S, S being utilized as a symmetric randomizing key, wherein S comprises an invertible matrix over CR;

determining $S^{-1}$;

for each set i of m distinct input elements among j elements comprising INP, wherein $0<m<k+1$ and $m\leq n$ selected from INP that are to be jointly randomized, and denoted hereinafter as $X_1, X_2, \ldots, X_m$, selecting n−m (n minus m) random numbers $Y_1, Y_2, \ldots Y_{n-m}$, in CR, where the input elements $X_1, X_2, \ldots, X_m$; at least one random number selected from among the set of random numbers $Y_1, Y_2, \ldots Y_{n-m}$; and, optionally, one or more constants are placed in a diagonal of an n×n diagonal matrix, denoted M, wherein, aside from the diagonal, matrix M is only populated by zeros; and determining random output $A_{im}$ for the m input elements in set i denoted as $\{X_{im}\}=X_1, X_2, \ldots, X_m$, by utilizing a matrix-based randomizing and homomorphic transformation function hereinafter denoted MRHT, wherein:

$$MRHT(\{X_{im}\}) = A_{im} = SMS^{-1} = \begin{pmatrix} a_{11} & \cdots & a_{1n} \\ \vdots & \ddots & \vdots \\ a_{n1} & \cdots & a_{nn} \end{pmatrix}$$

thereby producing a random output $A_{im}$ corresponding to the i set of m input elements $\{X_{im}\}=X_1, X_2, \ldots, X_m$; and (b) selecting n random numbers in CR, the n random numbers hereinafter denoted as $v_1, v_2, \ldots, v_n$;

determining a public polynomial $P(v)=\Pi_{i=1}^{n}(v-v_i)=\Sigma_{j=0}^{n}C_j \cdot v^j$ ($C_n=1$);

choosing n−m random values in CR, for $a_{i,m}, a_{i,m+1} \ldots, a_{i,n-1}$, that would yield a solution for the above equations for $a_{i,0}, a_{i,1} \ldots, a_{i,m-1}$; and selecting a polynomial-based randomizing and homomorphic transformation function hereinafter denoted PRHT ($X_{im}$), comprising any function in variable v of the form $\Sigma_{j=0}^{n-1}a_{ij} \cdot v^j$ which satisfies the equations:

$\Sigma_{j=0}^{n-1}a_{ij} \cdot v_1^j = X_1, \Sigma_{j=0}^{n-1}a_{ij} \cdot v_2^j = X_2, \ldots, \Sigma_{j=0}^{n-1}a_{ij} \cdot v_m^j = X_m$;

if (b) was performed, then performing either one of (c) or (d):

(c) producing a random output $A_{im}$ corresponding to input elements $X_1, X_2, \ldots, X_m$ comprising the set $(a_{i0}, a_{i1}, \ldots, a_{i\,n-1})$ and public set of coefficients $(C_0, C_1, \ldots, C_{n-1}, C_n)$ of P(v), wherein the public set of coefficients $(C_0, C_1, C_{n-1}, C_n)$ are required for arithmetic performing operations with input elements;

(d) selecting for the given input elements $X_1, X_2, \ldots, X_m$, n−m random values $R_1, \ldots, R_{n-m}$ in CR that would solve the following n simultaneous equations: $\Sigma_{j=0}^{n-1}a_{ij} \cdot v_1^j = X_1, \Sigma_{j=0}^{n-1}a_{ij} \cdot v_2^j = X_2, \ldots, \Sigma_{j=0}^{n-1}a_{ij} \cdot v_m^j = X_m, \Sigma_{j=0}^{n-1}a_{ij} \cdot v_{m+1}^j = R_1, \Sigma_{j=0}^{n-1}a_{ij} \cdot v_{m+2}^j = R_2, \ldots, \Sigma_{j=0}^{n-1}a_{ij} \cdot v_n^j = R_{n-m}$ for unknowns $a_{i0}, a_{i1}, \ldots, a_{i\,n-1}$, thereby producing, for $X_1, X_2, \ldots X_m$ a random text comprising the set $(a_{i0}, a_{i1}, \ldots, a_{i\,n-1})$ and public set $(C_0, C_1, \ldots, C_{n-1}, C_n)$ of P(v); and after the performing either one of (a) or (b), and if (b) was performed additionally performing either one of (c) or (d), then outputting one or both of a randomized transformed first output comprising a randomized transformation of the key and a randomized transformed second output comprising a randomized transformation of the text.

2. The method according to claim 1 wherein the low performance security element comprises a smart card.

3. The method according to claim 1 wherein the key comprises a cryptographic key.

4. The method according to claim 3 wherein the cryptographic key comprises an AES key.

5. The method according to claim 1 wherein the text comprises a plaintext.

6. The method according to claim 1 wherein the text comprises a ciphertext.

7. The method according to claim 1 wherein the side channel attacks comprise a differential power analysis type side channel attack.

8. A method for derandomizing the randomized input of claim 1, the method comprising:

performing either one of (a) or (b):

(a) receiving an output comprising a randomized $X_{im}$ input being an n×n diagonal matrix denoted hereinafter as $A_{im}$, over CR, where:

$$A_{im} = MRHT(X_{im}) = S_{MS}^{-1} = \begin{pmatrix} a_{11} & \cdots & a_{1n} \\ \vdots & \ddots & \vdots \\ a_{n1} & \cdots & a_{nn} \end{pmatrix}$$

using S to determine $$S^{-1} = \begin{pmatrix} s'_{11} & \cdots & s'_{1n} \\ \vdots & \ddots & \vdots \\ s'_{n1} & \cdots & s'_{nn} \end{pmatrix}$$

and determining $X_{im}$ by performing one of:

$S^{-1} \cdot A_{im} \cdot S = M$ where $X_1, X_2, \ldots, X_m$ are the upper left elements of the resulting diagonal matrix above, alternatively:

$X_i = (1/s'_{i1}) \cdot \Sigma_{j=1}^{n} a_{j1} \cdot s'_{ij}$ for $i=1, \ldots m$; and (b) receiving the randomized output for $X_{im}$ as $(a_{i0}, a_{i1}, \ldots, a_{i\,n-1})$ and using $v_1, v_2, \ldots, v_m$ to determine the derandomized input $\Sigma_{j=0}^{n-1}a_{ij} \cdot v_1^j = X_1, \Sigma_{j=0}^{n-1}a_{ij} \cdot v_2^j = X_2, \ldots, \Sigma_{j=0}^{n-1}a_{ij} \cdot v_m^j = X_m$.

9. A method for addition of randomized $X_1$ and randomized $X_2$, $X_1$ and $X_2$ being randomized according to the fully homomorphic method for randomizing an input of claim 1, the method comprising:

for $X_i$ comprising MRHT $(X_i)=A_i$:
  receiving $A_1$ and $A_2$; and
  MRHT $(X_1)$+MRHT $(X_2)=A_1+A_2$; and
for $X_i$ comprising PRHT $(X_i)=a_{i0}, a_{i1}, a_{i\,n-1}$:
  receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, \ldots, C_{n-1}, C_n$ of $P(v)=\Sigma_{j=0}{}^n C_j \cdot v^j$ ($C_n=1$); and
  PRHT $(X_1)$+PRHT $(X_2)=a_{10}+a_{20}, a_{11}+a_{21}, \ldots, a_{1\,n-1}+a_{2\,n-1}$.

10. A method for multiplication of randomized $X_1$ and randomized $X_2$, $X_1$ and $X_2$ being randomized according to the fully homomorphic method for randomizing an input of claim 1, the method comprising:
for $X_i$ comprising MRHT $(X_i)=A_i$:
  receiving $A_1$ and $A_2$; and
  MRHT $(X_1) \cdot$ MRHT $(X_2)=A_1 \cdot A_2$; and
for $X_i$ comprising PRHT $(X_i)=a_{i0}, a_{i1}, \ldots, a_{i\,n-1}$:
  receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, \ldots, C_{n-1}, C_n$ of $P(v)=\Sigma_{j=0}{}^n C_j \cdot v^j$ ($C_n=1$); and
  PRHT $(X_1) \cdot$ PRHT $(X_2)=r=r_{10}, r_{11}, \ldots, r_{1\,n-1}$, the coefficients of the resulting n-1 order polynomial $r(v)$, where $r(v)=((\Sigma_{j=0}^{n-1} a_{1j} \cdot v^j) \cdot (\Sigma_{j=0}^{n-1} a_{2j} \cdot v^j)) \bmod \Sigma_{j=0}{}^n C_j \cdot v^j$.

11. A method for dividing of randomized $X_1$ and randomized $X_2$, $X_1$ and $X_2$ being randomized according to the fully homomorphic method for randomizing an input of claim 1, the method comprising:
for $X_i$ comprising MRHT $(X_i)=A_i$:
  receiving $A_1$ and $A_2$;
  $1/$MRHT $(X_2)=A_2^{-1}$ and
  MRHT $(X_1)/$MRHT $(X_2)=A_1 \cdot A_2^{-1}$
for $X_i$ comprising PRHT $(X_i)=a_{i0}, a_{i1}, \ldots, a_{i\,n-1}$:
  receiving PRHT $(X_1)=a_{10}, a_{11}, \ldots, a_{1\,n-1}$ and PRHT $(X_2)=a_{20}, a_{21}, \ldots, a_{2\,n-1}$ and $C_0, C_1, C_{n-1}, C_n$ of $P(v)=\Sigma_{j=0}{}^n C_j \cdot v^j$ ($C_n=1$);
  deriving $1/$PRHT$(X_2)=u_{20}, u_{21}, \ldots, u_{2\,n-1}$ by calculating $((\Sigma_{j=0}^{n-1} u_{2j} \cdot v^j) \cdot (\Sigma_{j=0}^{n-1} a_{2j} \cdot v^j)) \bmod \Sigma_{j=0}{}^n c_j \cdot v^j = 1$ in terms of n unknown coefficients $u_{2j}$, ($j=0, \ldots, n-1$), thereby determining $\Sigma_{j=0}^{n-1} g_{2j}(u_{20}, u_{21}, \ldots, u_{2\,n-1}, a_{10}, a_{21}, \ldots, a_{2\,n-1}, c_{10}, c_{21}, \ldots, c_{2\,n-1},) \cdot v^k)$, wherein $g_{2j}(\ )$ is a linear combination of a plurality of n unknowns $u_{2j}$;
  solving n derived equations $g_{20}(\ )=1$, and $g_{2j}(\ )=0$ for $j=1, \ldots, n-1$ for all $u_{2j}$ $j=0, \ldots, n-1$; and
$PRHT(X_1)/PRHT(X_2)=PRHT(X_1) \cdot (1/PRHT(X_2))=$
$((\Sigma_{j=0}^{n-1} a_{1j} \cdot v^j) \cdot (\Sigma_{j=0}^{n-1} u_{2j} \cdot v^j)) \bmod \Sigma_{j=0}{}^n C_j \cdot v^j$.

12. A method for addition of a pair of cipher text outputs Ci and Cj, Ci and Cj being cipher texts produced as an output from a plain text input and all computations are performed modulo N over a ring $Z_N$, where N is a product of two prime numbers, and matrix S comprises symmetric encryption key, wherein the encryption functions are denoted as MEnc and PEnc correspond to MRHT and PRHT, respectively, the method comprising adding Ci and Cj according to the method of claim 9 wherein all computations are performed modulo N over a ring $Z_N$, where N is a product of two prime numbers, and matrix S comprises symmetric encryption key.

13. A method for multiplication of a pair of cipher text outputs Ci and Cj, Ci and Cj comprising cipher texts produced as an output from a plain text input and all computations are performed modulo N over a ring $Z_N$, where N is a product of two prime numbers, and matrix S comprises symmetric encryption key, wherein the encryption functions are denoted as MEnc and PEnc correspond to MRHT and PRHT, respectively, the method comprising multiplying Ci and Cj according to the method of claim 10, wherein all computations are performed modulo N over a ring $Z_N$, where N is a product of two prime numbers, and matrix S comprises a symmetric encryption key.

14. A method for division of a pair of cipher texts outputs Ci and Cj, Ci and Cj comprising cipher texts produced as an output from a plain text input and all computations are performed modulo N over a ring $Z_N$, where N is a product of two prime numbers, and matrix S comprises symmetric encryption key, wherein the encryption functions are denoted as MEnc and PEnc correspond to MRHT and PRHT, respectively, the method comprising dividing Ci and Cj according to the method of claim 11 wherein all computations are performed modulo N over a ring $Z_N$, where N is a product of two prime numbers, and matrix S comprises symmetric encryption key.

* * * * *

UNITED STATES PATENT AND TRADEMARK OFFICE
CERTIFICATE OF CORRECTION

PATENT NO. : 9,571,268 B2
APPLICATION NO. : 15/132271
DATED : February 14, 2017
INVENTOR(S) : Aviad Kipnis et al.

It is certified that error appears in the above-identified patent and that said Letters Patent is hereby corrected as shown below:

On the Title Page

In the illustrative figure, Line 11 approx., delete "PERFOMANCE" and insert --PERFORMANCE--.

On Page 2, item (56), Other Publication, Column 2, Line 7, delete "ACM" and insert --3rd ACM--.

On Page 2, item (56), Other Publication, Column 2, Line 7, delete "Clud" and insert --Cloud--.

On Page 2, item (56), Other Publication, Column 2, Line 9, delete "Quadric" and insert --Quadratic--.

In the Drawings

Sheet 1 of 7, Fig. 1, Line 11 approx., delete "PERFOMANCE" and insert --PERFORMANCE--.

In the Specification

Column 2, Line 26, delete "q))" and insert --q)--.

Column 5, Line 29 approx., delete "$a_{20}a_{11}$" and insert --$a_{20}$, $a_{11}$--.

Column 5, Line 29 approx., delete "+$a_2$" and insert --+ $a_2$--.

Column 5, Line 52 approx., delete ".$v^j$)," and insert --.$v^j$,--.

Column 7, Line 36 approx., delete "the of the" and insert --of the--.

Column 7, Line 43 approx., delete "the of the" and insert --of the--.

Column 9, Line 7, delete "problem)." and insert --problem.--.

Signed and Sealed this
Sixth Day of March, 2018

Andrei Iancu
*Director of the United States Patent and Trademark Office*

Column 9, Line 9 approx., delete "$X_2$, $X_m$" and insert --$X_2,... X_m$--.

Column 9, Line 20, delete "$X_{h-1}$," and insert --$X_{h+1}$,--.

Column 11, Line 26 approx., delete "$S^{-1}$" and insert --$S^{-1}$ =--.

Column 12, Line 24, delete "A," and insert --$A_i$--.

Column 18, Line 12, delete "$X_i$:" and insert --$X_i$;--.

Column 18, Line 53, delete "+=" and insert --=--.

Column 18, Line 65, delete "input" and insert --input.--.

Column 22, Line 58, delete "x1" and insert --$x_1$--.

Column 23, Line 55, delete "x1" and insert --$x_1$--.

Column 24, Line 23 approx., delete "techniques. any" and insert --techniques. Any--.

In the Claims

Column 26, Claim 1, Line 1, delete "$C_1$, $C_{n-1}$," and insert --$C_1,..., C_{n-1}$,--.

Column 26, Claim 8, Line 49 approx., delete "$s'_{in}$" and insert --$s'_{1n}$--.

Column 27, Claim 9, Line 4, delete "$a_{i1}$, $a_{i\,n-1}$:" and insert --$a_{i1},..., a_{i\,n-1}$:--.

Column 27, Claim 9, Line 8 approx., delete "$a_{20}a_{11}$" and insert --$a_{20}$, $a_{11}$--.

Column 27, Claim 10, Line 22, delete "=r=$r_{10}$," and insert --=$r_{10}$,--.

Column 27, Claim 11, Line 36, delete "$C_1$, $C_{n-1}$," and insert --$C_1,..., C_{n-1}$,--.

Column 28, Claim 11, Line 1, delete "$v^k$)," and insert --$v^j$),--.